United States Patent
Krause et al.

(10) Patent No.: US 10,767,714 B2
(45) Date of Patent: Sep. 8, 2020

(54) DISK BRAKE HAVING A PAD-RETAINING CLIP AND A SECURING DEVICE, AND BRAKE PAD SET

(71) Applicant: KNORR-BREMSE Systeme fuer Nutzfahrzeuge GmbH, Munich (DE)

(72) Inventors: Oliver Krause, Wolfratshausen (DE); Matthias Klingner, Moorenweis (DE); Tobias Schoefberger, Mainburg (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 208 days.

(21) Appl. No.: 15/970,241

(22) Filed: May 3, 2018

(65) Prior Publication Data
US 2018/0252280 A1  Sep. 6, 2018

Related U.S. Application Data

(63) Continuation of application No. PCT/EP2016/075888, filed on Oct. 27, 2016.

(30) Foreign Application Priority Data

Nov. 3, 2015 (DE) ........................ 10 2015 118 838

(51) Int. Cl.
*F16D 65/40* (2006.01)
*F16D 65/097* (2006.01)
*F16D 55/00* (2006.01)

(52) U.S. Cl.
CPC .... *F16D 65/0978* (2013.01); *F16D 2055/007* (2013.01); *F16D 2250/0084* (2013.01)

(58) Field of Classification Search
CPC .. F16F 65/097; F16F 65/0974; F16F 65/0977; F16F 65/0978
See application file for complete search history.

(56) References Cited

U.S. PATENT DOCUMENTS

| 8,016,084 B2 | 9/2011 | Camilo-Martinez et al. |
| 8,220,595 B2 | 7/2012 | Camilo-Martinez et al. |

(Continued)

FOREIGN PATENT DOCUMENTS

| CN | 1749592 A | 3/2006 |
| CN | 101571169 A | 11/2009 |

(Continued)

OTHER PUBLICATIONS

Machine translation of DE 10 2014 107227 (no date).*

(Continued)

*Primary Examiner* — Nicholas J Lane
(74) *Attorney, Agent, or Firm* — Crowell & Moring LLP

(57) ABSTRACT

A disk brake for a vehicle, in particular for a utility vehicle, is provided. The disk brake includes a brake disk, a brake caliper with application and back sections, brake pads having pad back plates with a pad-retaining spring supported under preload by a pad-retaining clip on the brake caliper, and a securing device releasably securing the pad-retaining clip via the pad back plate of the back-side brake pad. The securing device has at least one clip element and at least one retainer. In an installed state, at least one section of the at least one clip element is in engagement with at least one section of the retainer. During installation/removal of the pad-retaining clip, the at least one clip element section can be moved against a spring force. A corresponding brake pad set is provided.

22 Claims, 26 Drawing Sheets

(56) References Cited

U.S. PATENT DOCUMENTS

| | | |
|---|---|---|
| 8,662,261 B2 | 3/2014 | Raffin et al. |
| 9,829,056 B2 | 11/2017 | Peschel et al. |
| 2006/0054430 A1 | 3/2006 | Maehara |
| 2008/0067016 A1* | 3/2008 | Pritz .................... F16D 55/225 188/73.38 |
| 2008/0289914 A1 | 11/2008 | Trimpe et al. |
| 2009/0211857 A1 | 8/2009 | Camilo-Martinez et al. |
| 2009/0236188 A1* | 9/2009 | Raffin ................ F16D 65/0974 188/73.31 |
| 2013/0068573 A1* | 3/2013 | Freund .................... B60T 1/065 188/72.4 |
| 2015/0184710 A1* | 7/2015 | Peschel ............... F16D 65/0068 188/73.32 |
| 2018/0142744 A1* | 5/2018 | Krause ................ F16D 65/0978 |
| 2018/0223921 A1* | 8/2018 | Krause .................. F16D 65/092 |
| 2018/0306257 A1* | 10/2018 | Goyke .................. F16D 65/092 |
| 2019/0056000 A1* | 2/2019 | Beyer ................. F16D 65/0973 |

FOREIGN PATENT DOCUMENTS

| | | |
|---|---|---|
| CN | 101932846 A | 12/2010 |
| CN | 102918293 A | 2/2013 |
| DE | 10 2005 045 877 B3 | 2/2007 |
| DE | 10 2005 049 057 A1 | 4/2007 |
| DE | 10 2006 051 965 A1 | 5/2007 |
| DE | 10 2006 034 764 A1 | 6/2007 |
| DE | 10 2007 049 979 A1 | 4/2009 |
| DE | 20 2008 013 446 U1 | 4/2009 |
| DE | 10 2007 046 945 A1 | 5/2009 |
| DE | 10 2008 010 570 B3 | 10/2009 |
| DE | 10 2012 108 667 A1 | 3/2014 |
| DE | 10 2014 107 227 A1 | 9/2015 |
| EP | 1 764 527 A1 | 3/2007 |
| EP | 2 050 980 B1 | 5/2017 |
| SU | 1666829 A2 | 7/1991 |

OTHER PUBLICATIONS

English translation of document C2 (German-language Written Opinion (PCT/ISA/237) previously filed on May 3, 2018) issued in PCT Application No. PCT/EP2016/075888 dated Feb. 13, 2017 (seven (7) pages).
Russian-language Office Action issued in counterpart Russian Application No. 2018120010/11(031533) dated Mar. 28, 2019 with English translation (seven (7) pages).
Chinese-language Office Action issued in counterpart Chinese Application No. 201680077435.3 dated Apr. 1, 2019 with English translation (10 pages).
International Search Report (PCT/ISA/210) issued in PCT Application No. PCT/EP2016/075888 dated Feb. 13, 2017 with English translation (six pages).
German-language Written Opinion (PCT/ISA/237) issued in PCT Application No. PCT/EP2016/075888 dated Feb. 13, 2017 (six pages).
German-language Office Action issued in counterpart German Application No. 10 2015 118 838.4 dated Sep. 2, 2016 (eight pages).
Hindi-language Office Action issued in Indian Application No. 201837016352 dated Mar. 11, 2020 with English translation (10 pages).

* cited by examiner

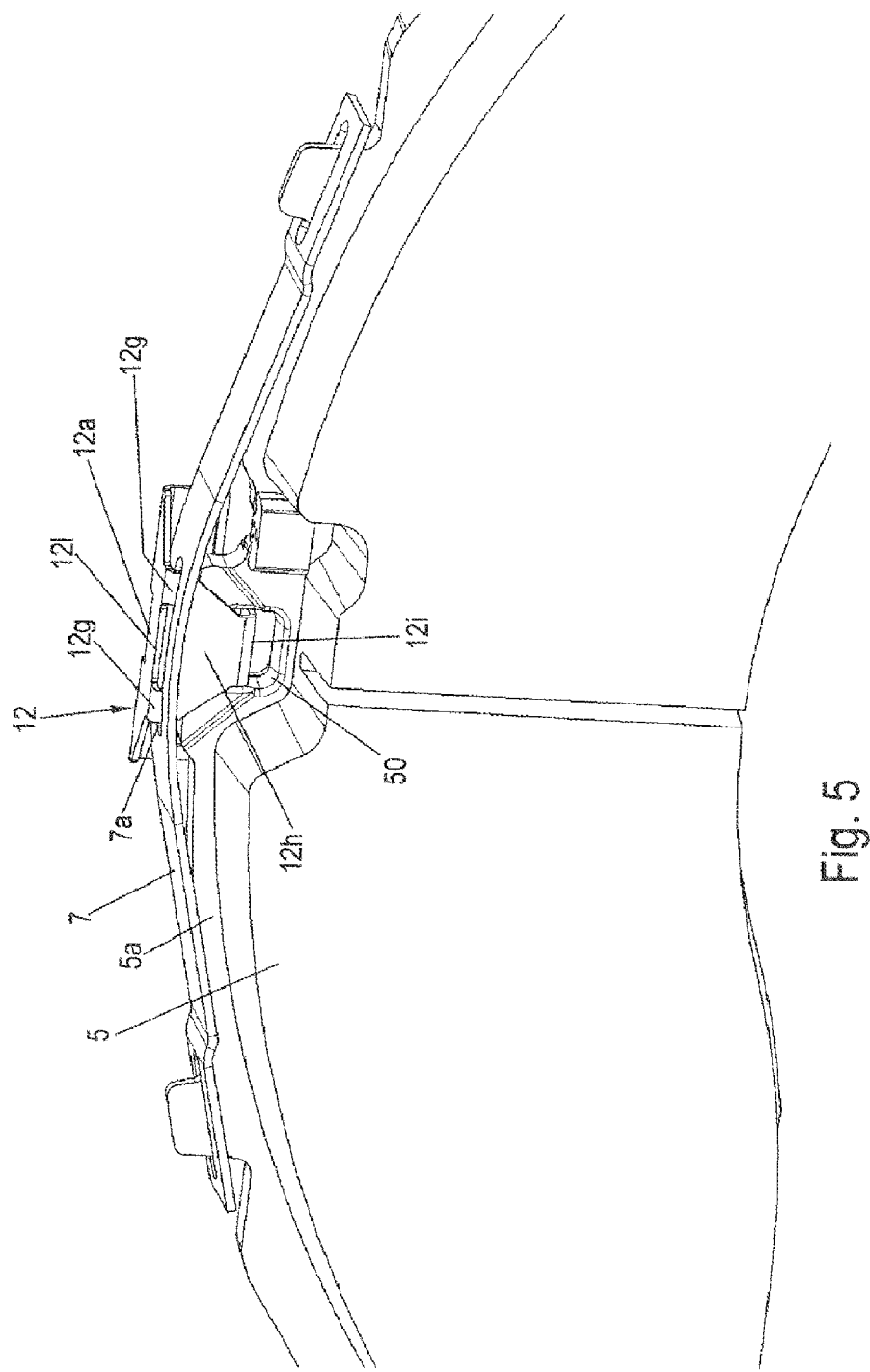

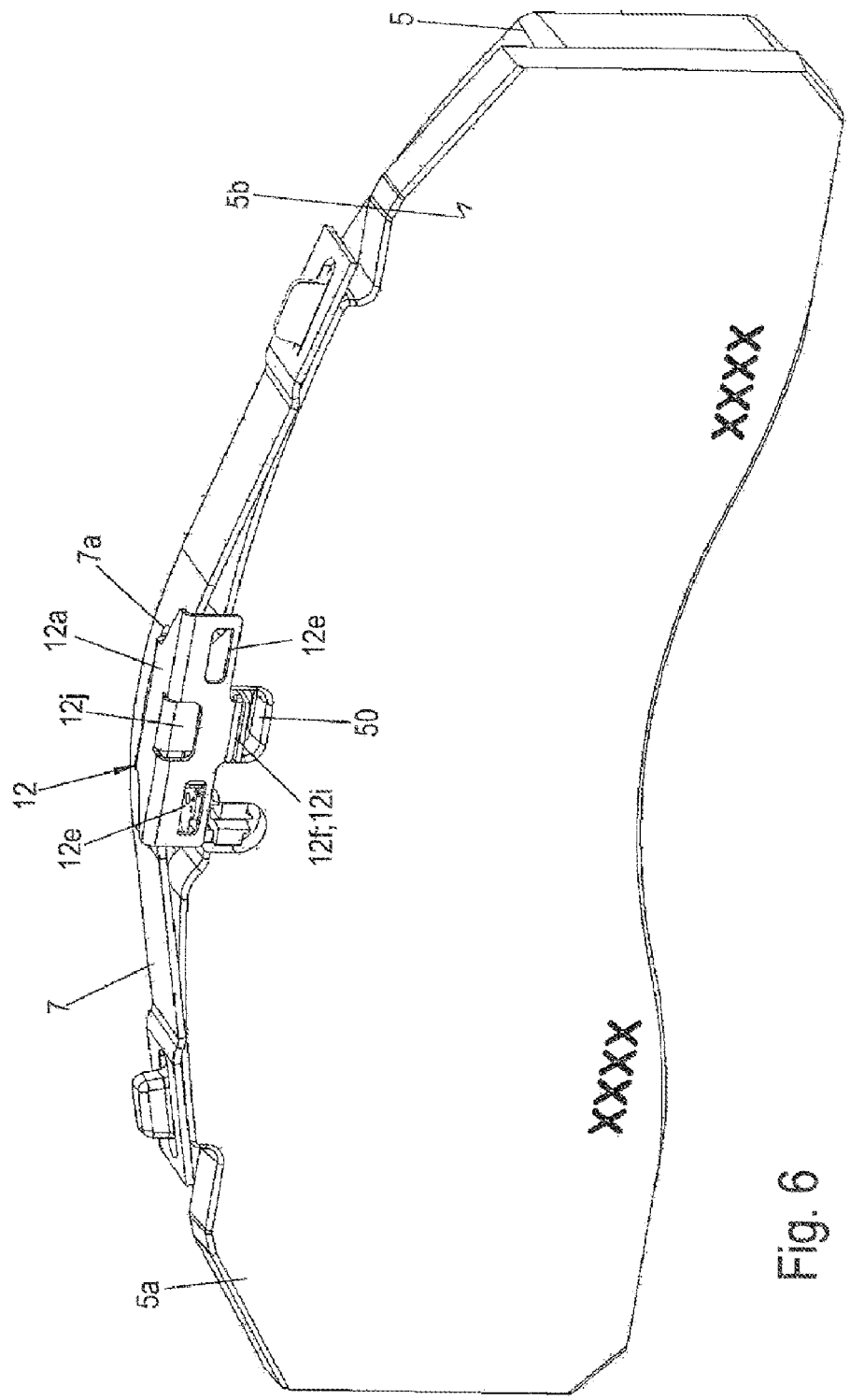

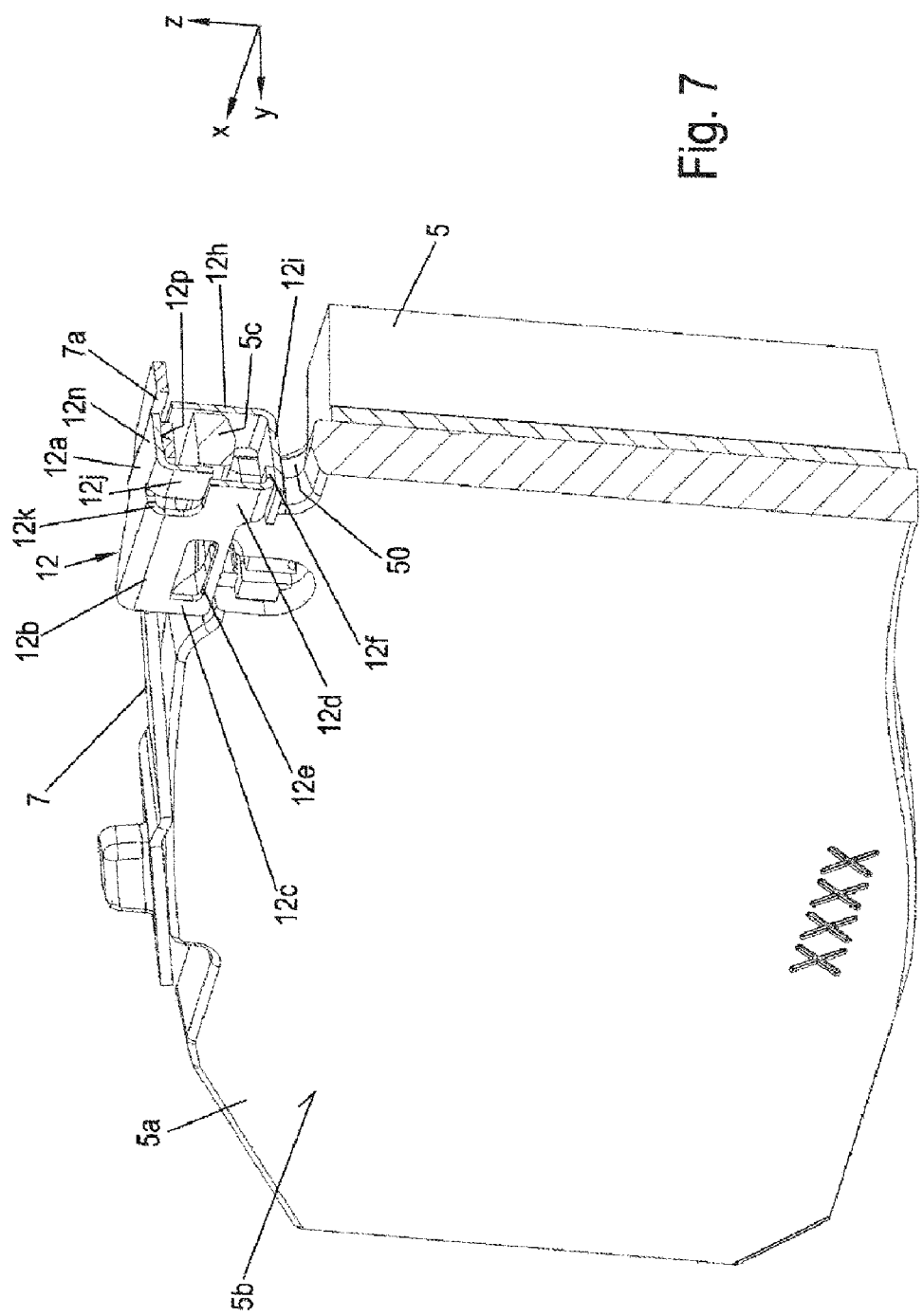

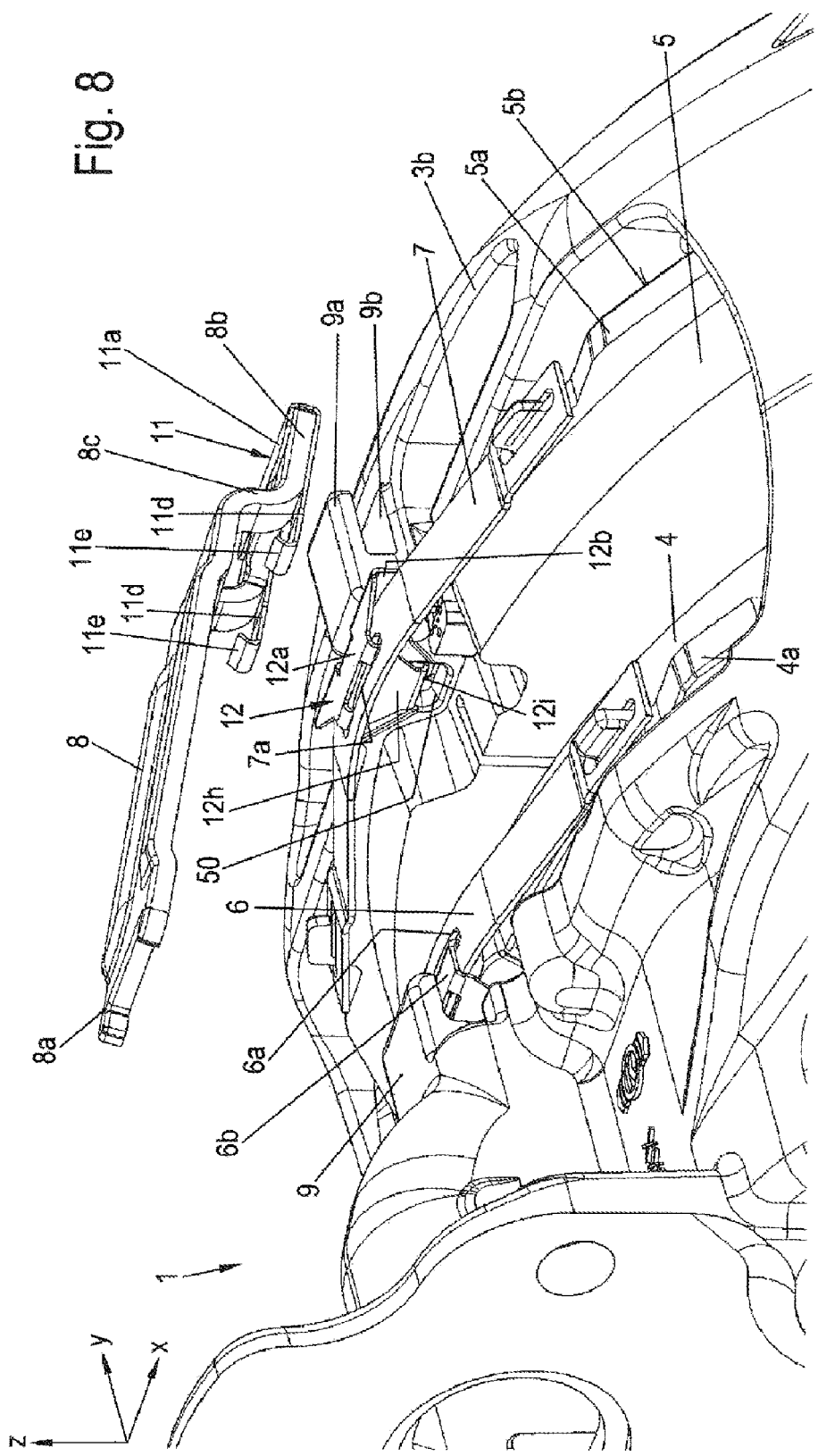

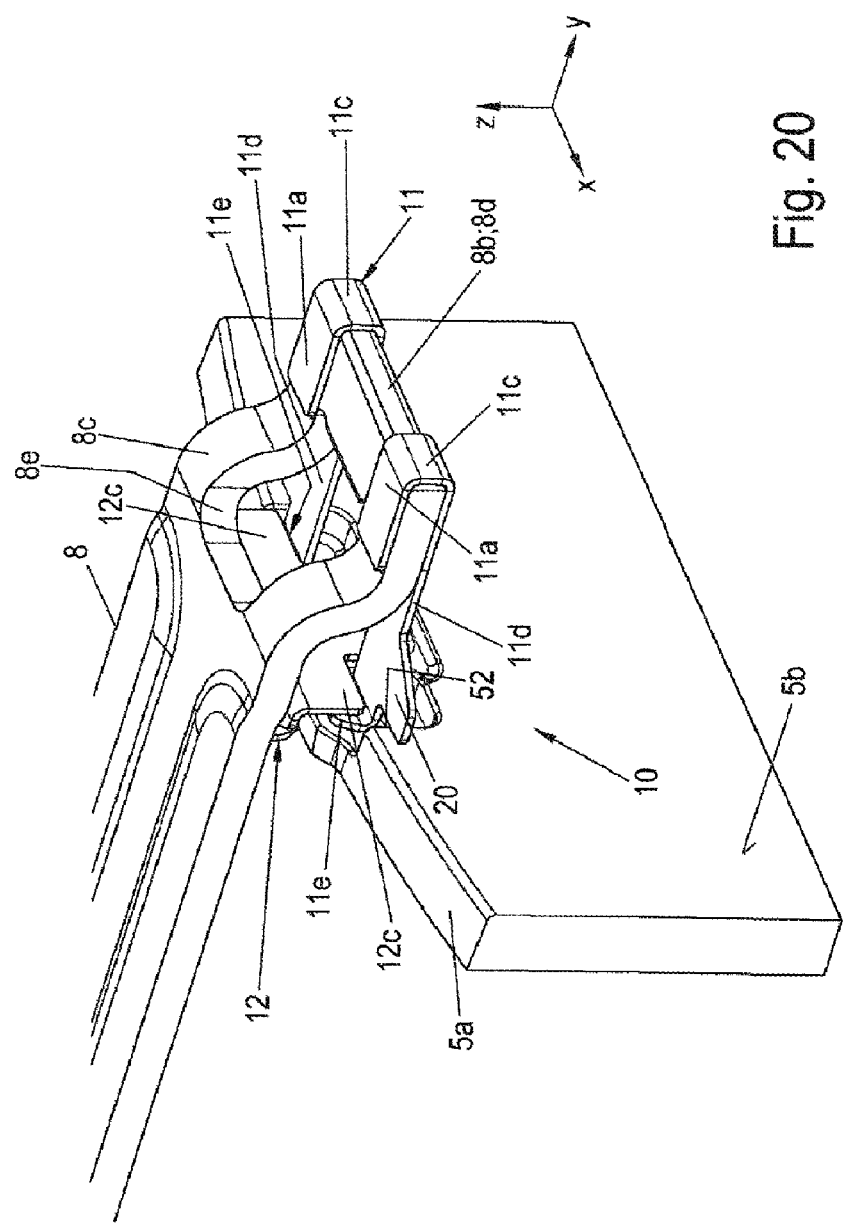

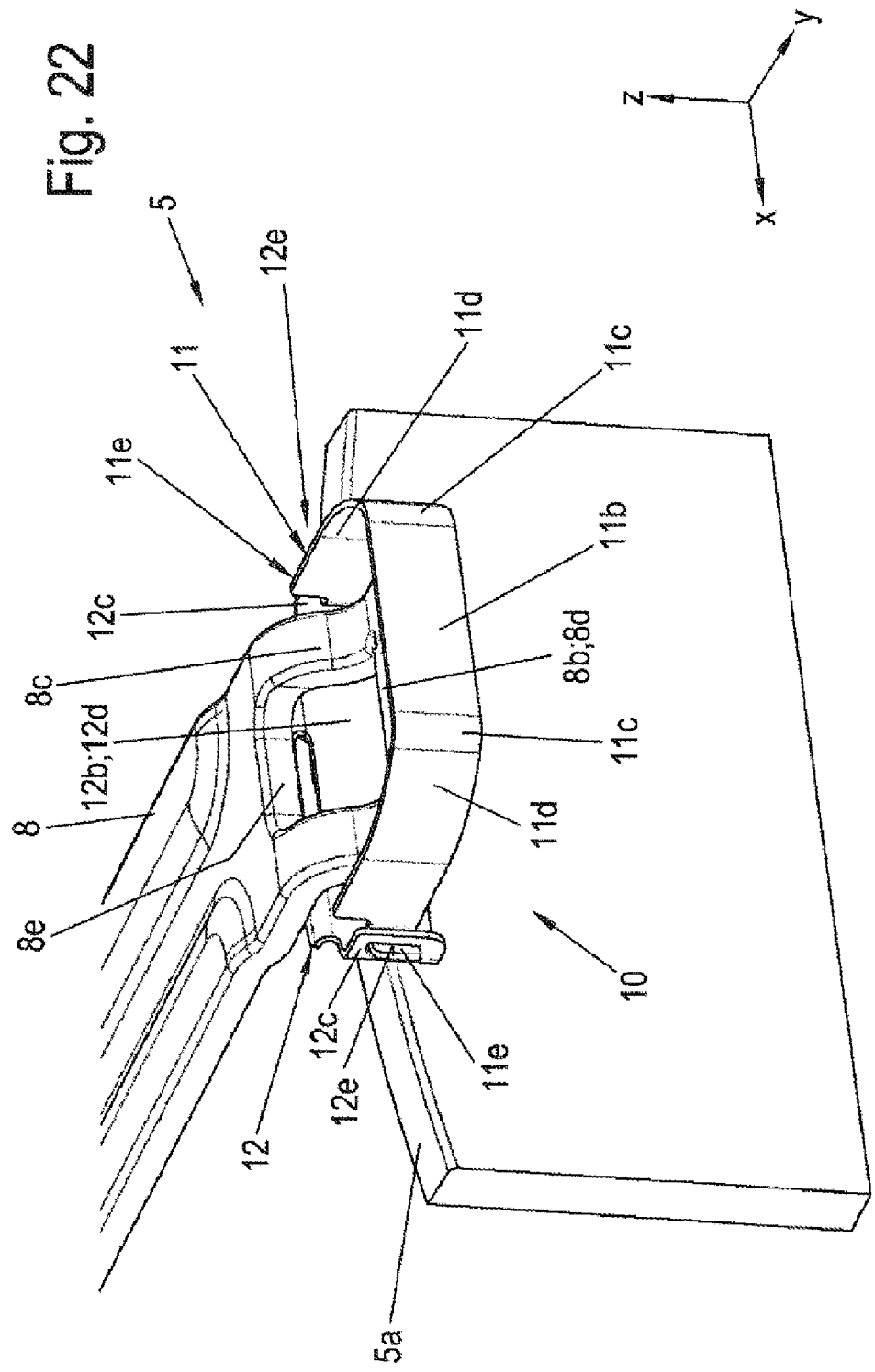

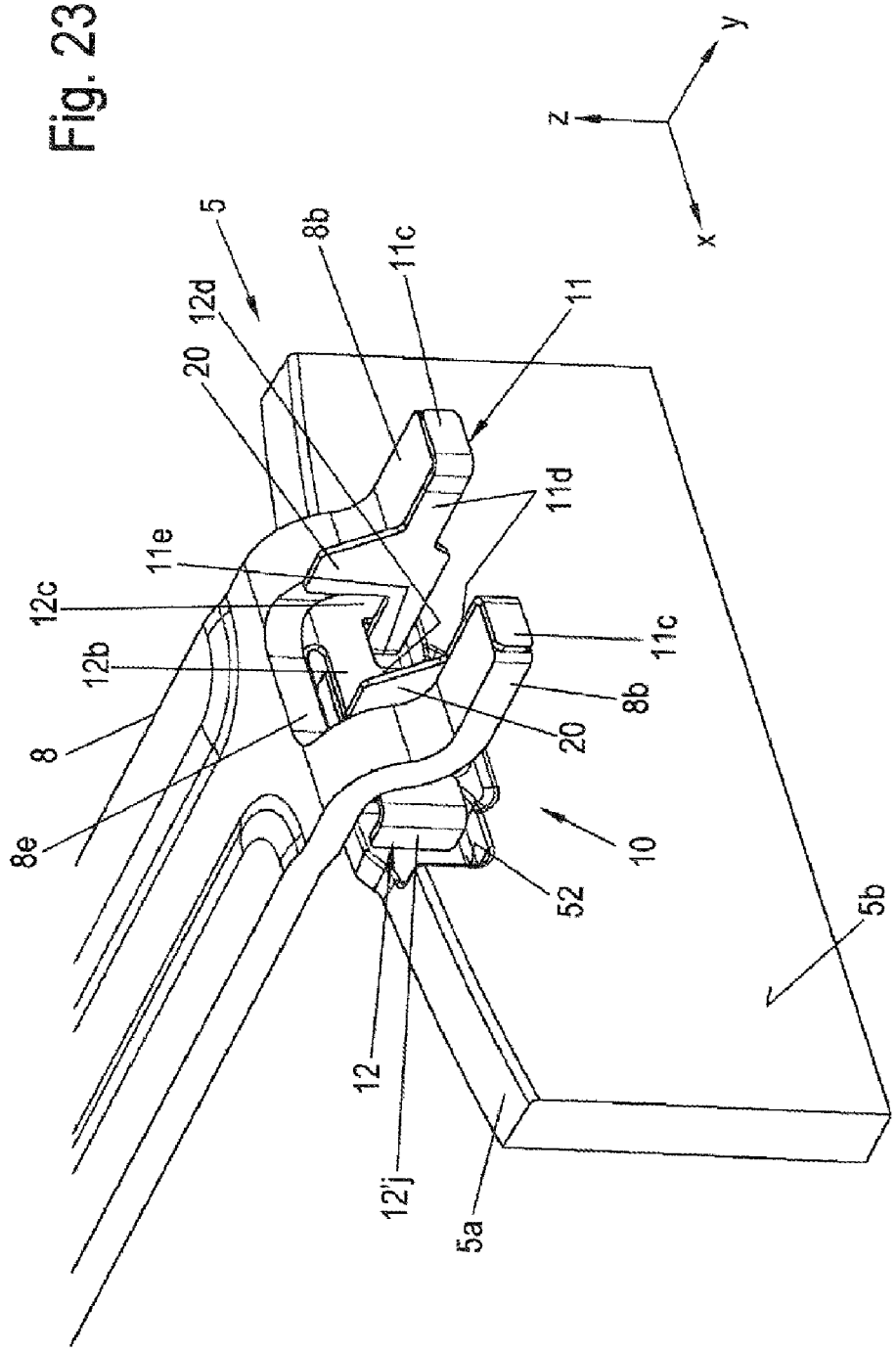

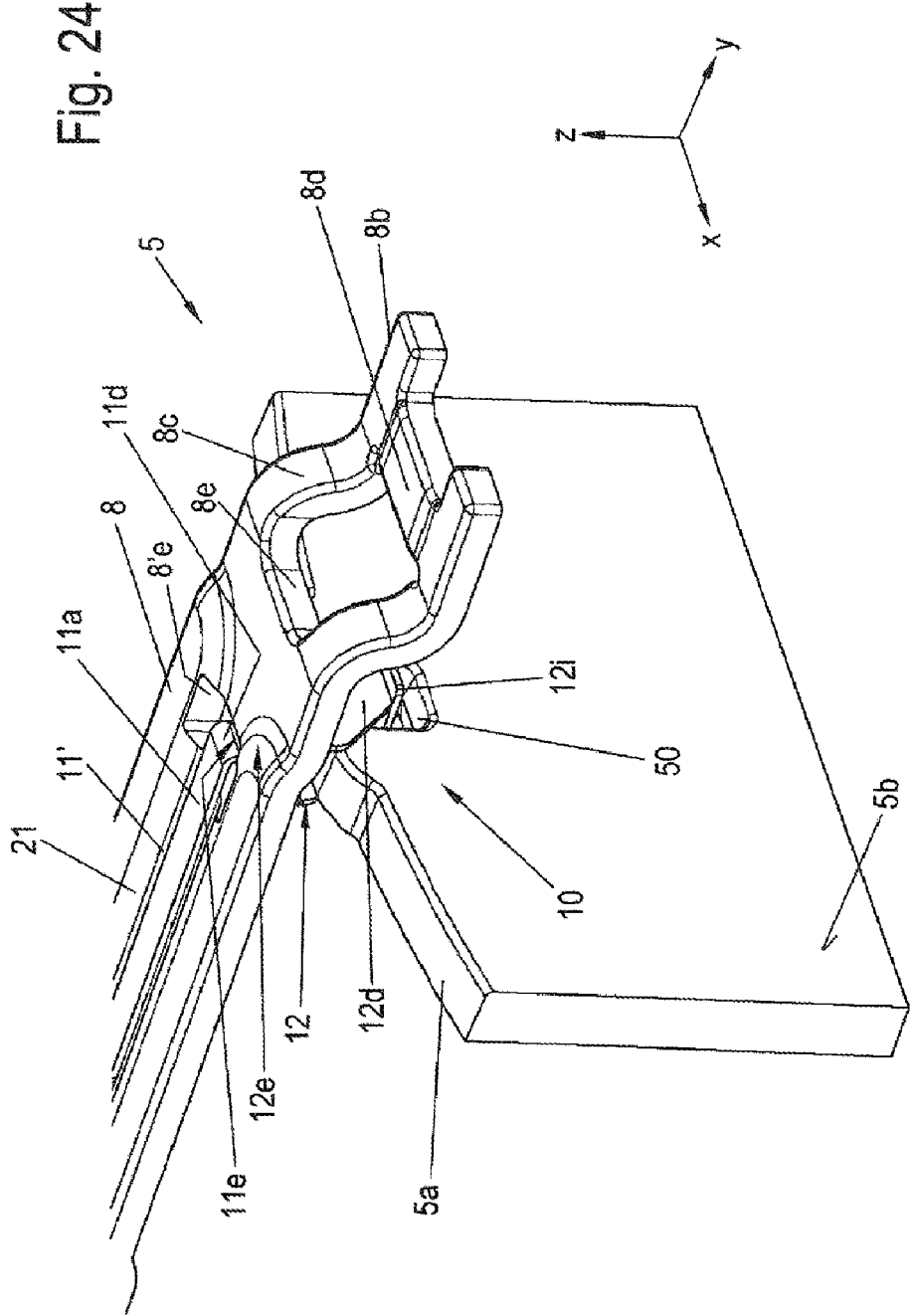

DISK BRAKE HAVING A PAD-RETAINING CLIP AND A SECURING DEVICE, AND BRAKE PAD SET

CROSS REFERENCE TO RELATED APPLICATIONS

This application is a continuation of PCT International Application No. PCT/EP2016/075888, filed Oct. 27, 2016, which claims priority under 35 U.S.C. § 119 from German Patent Application No. 10 2015 118 838.4, filed Nov. 3, 2015, the entire disclosures of which are herein expressly incorporated by reference.

BACKGROUND AND SUMMARY OF THE INVENTION

The present invention relates to a disk brake having a pad retaining clip and securing device. The invention also relates to a brake pad set for a disk brake of said type.

Brake pads of disk brakes, in particular pneumatic disk brakes, in vehicles, for example utility vehicles, are held in so-called pad slots by a pad retaining clip. In order that the pad retaining clip cannot be displaced out of its position by lateral forces in the vehicle, additional components are required which not only prevent a displacement of the retaining clip, in particular during operation, but also permit mounting and dismounting.

Said additional components include, for example, combinations of bolts and securing splints, spring elements and screws. After the insertion of the brake pads and mounting of the pad retaining clip, it may be the case that a technician thereafter forgets to attach the components for securing purposes. Securing of the pads is thus realized only for an indefinite length of time; the error is inevitably not obvious. In the worst case, the pad retaining clip may under some circumstances slip during operation and impair a securing action of the brake pads.

Numerous proposals have been made for such securing components and securing devices. One example, for illustration, is presented by document DE 102005045877 B3; a further example is described in document DE 202008013446 U1.

There is a constant demand for increased functional reliability during operation, lower production costs, easy installation and mounting, and shorter servicing times.

A disk brake according to the invention for a vehicle, in particular for a utility vehicle, includes a brake disk with a brake disk axis of rotation, a brake caliper, in particular a sliding caliper, with an application section and a rear section, at least two brake pads with in each case one pad rear plate equipped with a pad retaining spring, which brake pads are supported in each case under the preload of a pad retaining clip detachably fastened to the brake caliper. An application-side brake pad is assigned to the application section and a rear-side brake pad is assigned to the rear section. A securing device for securing the position of the pad retaining clip forms a detachable connection between the pad retaining clip and the pad rear plate of the rear-side brake pad. The securing device has at least one bracket element and at least one retainer. In an installed state of the pad retaining clip, in each case at least one section of the at least one bracket element is in engagement with at least one section of the retainer, and during the mounting/dismounting of the pad retaining clip the at least one section of the at least one bracket element is movable counter to a spring force of said at least one section or of at least one section, connected to said section, of the at least one bracket element.

The securing device offers the advantage that securing of the pad retaining clip against inadvertent release, for example during operation of the vehicle in which the disk brake is installed, automatically enters into engagement during mounting of the pad retaining clip, without the need for a tool or further mounting steps. Dismounting of the pad retaining clip however requires a tool, such that dismounting is possible only intentionally, and does not occur of its own accord. This is possible by virtue of the fact that the at least one section of the at least one bracket element is, during mounting/dismounting of the pad retaining clip, movable counter to a spring force of said at least one section or of at least one section, connected to said section, of the at least one bracket element.

In one embodiment, the retainer of the securing device is integrated into the pad rear plate of the rear-side brake pad. In this way, a number of parts is reduced.

It is provided here that the retainer has at least one opening through which the at least one section of the at least one bracket element extends and which, in the installed state of the pad retaining clip, is in engagement with the at least one section of the retainer. The opening makes it possible that the section of the bracket element, for example by use of suitable shaping, is automatically pushed downward counter to the spring force during the insertion, and, after passing through the opening, is pushed upward into engagement with the retainer by the spring force thus stressed. It is self-evidently also possible that the section of the bracket element can be pushed downward manually and/or using a tool for the purposes of being inserted into and through the opening.

In an alternative, the retainer of the securing device is formed as a clamp element and is attached to the pad rear plate of the rear-side brake pad. Said clamp element can be produced in lightweight form and inexpensively, for example as a punched/bent part.

In one embodiment, the retainer comprises a plate section, a face section with retaining section, and a side section, wherein the face section with the retaining section and the side section are attached to the plate section in a substantially right-angled manner so as to be parallel to and spaced apart from one another. The retainer is attached via a fastening surface of the side section to a rear surface of the rear-side pad rear plate. Here, the advantage consists in simple attachment to the rear surface of the pad carrier plate, for example by riveting or screwing. The retaining section interacts with a hook-shaped end section of the bracket element such that the hook-shaped end section enters into engagement in contact with a surface of the retaining section.

In an alternative embodiment, the retainer is formed as a clamp element and spring retainer for the pad retaining spring of the rear-side brake pad. A clamp element of said type is used, in a basic form, as a spring retainer and requires only minor modifications to form a suitable retainer. It is furthermore advantageous here that the production process only has to be slightly modified.

It is provided here that the retainer, as clamp element, comprises a plate section, face sections, at least one retaining section, a side section, and a lug section, wherein the face section with the at least one retaining section and the side section are attached to the plate section in a substantially right-angled manner so as to be parallel to and spaced apart from one another, wherein the lug section runs parallel to the plate section and extends through an opening of the pad rear plate and, after the mounting of the retainer on the pad rear plate, is fixedly connected to the face section. The retainer of the securing device is thus attached in a captively held manner to the pad rear plate.

In a further embodiment, the side section of the retainer extends at least partially through a passage opening of the rear-side pad retaining spring, wherein a partial section of the rear-side pad retaining spring is retained between the plate section of the retainer and the pad rear plate, whereby the spring retainer for the rear-side pad retaining spring is formed. The advantage of the additional function of a spring retainer is thus made possible.

A further embodiment provides that the at least one retaining section of the retainer has at least one opening through which the at least one section of the at least one bracket element extends and, in the installed state of the pad retaining clip, engages with the at least one retaining section of the retainer. The openings offer advantageous restraint of those sections of the bracket element which are in engagement with the retaining section, because the openings also restrict a lateral mobility of the sections of the bracket element, and thus make it additionally more difficult for the engagement to become released of its own accord.

In another embodiment, the retainer has a stop in a direction parallel to the brake disk axis of rotation, by which the retainer bears against the pad rear plate at least at one side. This is advantageous because, in this way, the retainer is greatly restricted in terms of a displacement movement in the direction of the brake disk axis of rotation.

For this purpose, the retainer may have a lug as a stop, the lug being attached to the plate section in a substantially right-angled manner and is arranged between the face section and the side section so as to be parallel to and spaced apart from these, wherein a web section of the pad rear plate is received between the lug of an inner side of the side section. The lug can thus be easily created during the production of the retainer, for example in one piece with the latter as a punched/bent part, and does not form an additional, separate component.

In an alternative, the stop of the retainer in a direction parallel to the brake disk axis of rotation may be formed by at least one lug which is attached to the at least one retaining section and which bears against a rear surface of the pad rear plate. Thus, at the same time, a spacing of the retaining section to the rear surface is realized, which spacing serves for receiving a hook-shaped end section of the bracket element, which rear surface is in engagement with the retaining section when the pad retaining clip is mounted.

In a further embodiment, an edge region of a bottom side of a central section of the plate section of the retainer is exposed by at least one recess which runs in the direction of the pad retaining spring. This yields the advantage that an edge of the pad retaining spring which, under the retainer, is in contact with the bottom side of the plate section, cannot damage said bottom side and/or the bent connections of the plate section to the sections attached to the longitudinal sides thereof. In this way, the service life of the retainer can be lengthened.

It is provided that the at least one bracket element is fastened to an end section of the pad retaining clip. This yields simple and fast engagement of the securing device during mounting of the pad retaining clip.

In one embodiment, the at least one section, which is in engagement with the at least one section of the retainer, of the at least one bracket element is formed as at least one resilient arm with a hook-shaped end section, wherein the hook-shaped end section is, in the installed state of the pad retaining clip, in engagement with the at least one section of the retainer. The hook-shaped end section yields, in conjunction with the resilient arm, the advantage of simple installation with simultaneous automatic assumption of the position of engagement of end section and retaining section.

For a simple fastening to the pad retaining clip, the bracket element may include a plate section to which the at least one resilient arm is attached, so as to run parallel to the plate section, by a face section, wherein the plate section, the face section and a section, running parallel to the plate section, of the at least one arm, form a receptacle for the end section of the pad retaining clip.

Alternatively, the bracket element may have at least one resilient arm with the hook-shaped end section, wherein the at least one resilient arm is attached with a section under the end section of the pad retaining clip. This advantageously saves material and space.

In a yet further embodiment, it is provided that the at least one resilient arm of the bracket element is connected to the hook-shaped end section by at least one cranked portion. The cranked portion may form advantageously additional engagement with the retaining section of the retainer. Furthermore, an adaptation to different installation situations and environments can thus be made possible.

For certain installation situations, it may be advantageous that the at least one resilient arm of the bracket element is connected to in each case at least one hook-shaped end section via a forked portion.

In another embodiment, the at least one resilient arm of the bracket element is equipped with at least one actuation section. This yields the advantage that, during a dismounting process, a release of the engagement by pressing against the spring force of the resilient arm is made easier.

A further embodiment provides that the retainer has two retaining sections, of which in each case one is attached to one side of a face section at right angles with respect to the face section and has in each case one opening which is in each case in engagement with a hook-shaped end section of the bracket element in the installed state of the pad retaining clip, wherein the bracket element is formed in the manner of a strip and includes a face section which is arranged in front of and fastened to the end section of the pad retaining clip. In each case one resilient arm with a hook-shaped end section is attached by a rounded face section to each side of the face section, wherein the end sections with the resilient arms for engagement with the respective opening of the associated retaining section are moved resiliently away from one another during the mounting of the pad retaining clip, and moved toward one another counter to the spring force of the resilient arms during the release of the engagement during dismounting of the pad retaining clip. Advantageously simple mounting/dismounting is thus made possible, because, during the release of the engagement, the resilient arms can be pushed toward one another even by hand, without the need for a tool.

In yet another embodiment, the plate section of the retainer forms the retaining section with the at least one opening, and the bracket element of the securing device is equipped with a plate section extending in a longitudinal direction and is fastened on a top side of the pad retaining clip centrally in the longitudinal direction. A downwardly bent resilient arm is attached to a front end of the plate section and extends through an opening of the pad retaining clip. The hook-shaped end section is integrally formed on the free end of the arm and is in engagement with the opening of the retainer. In this way, a range of use in particular in constricted structural spaces is permitted and enhanced.

It is provided that the bracket element is connected to the pad retaining clip by riveting, screwing, welding, clinching, stamping or the like. Rapid and also automated fastening of the bracket element to the pad retaining clip is thus possible.

A brake pad set for that which has been described above comprises the two brake pads on the respective pad rear plate, the associated pad retaining springs, the pad retaining clips and the securing device. Said components are coordinated with one another and permit simple and reliable mounting.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 5-7 show various schematic perspective views of a brake pad with the retainer of the first embodiment of the securing device.

FIGS. 8-10 show various schematic perspective views of the disk brake according to the invention as per FIG. 1 with installation situations of the pad retaining clip.

FIGS. 17-20 show schematic perspective views of variants of the first embodiment of the securing device with actuation sections.

FIGS. 21-23 shows schematic perspective views of further variants of the first embodiment of the securing device.

FIG. 24 shows a schematic perspective view of the brake pad with a third embodiment of the securing device of the present invention.

DETAILED DESCRIPTION OF THE DRAWINGS

Below, expressions such as "top", "bottom", "right", "left" etc. are used, which relate to the orientations in the figures. Coordinates x, y, z in the figures serve for further orientation.

Figure 1:
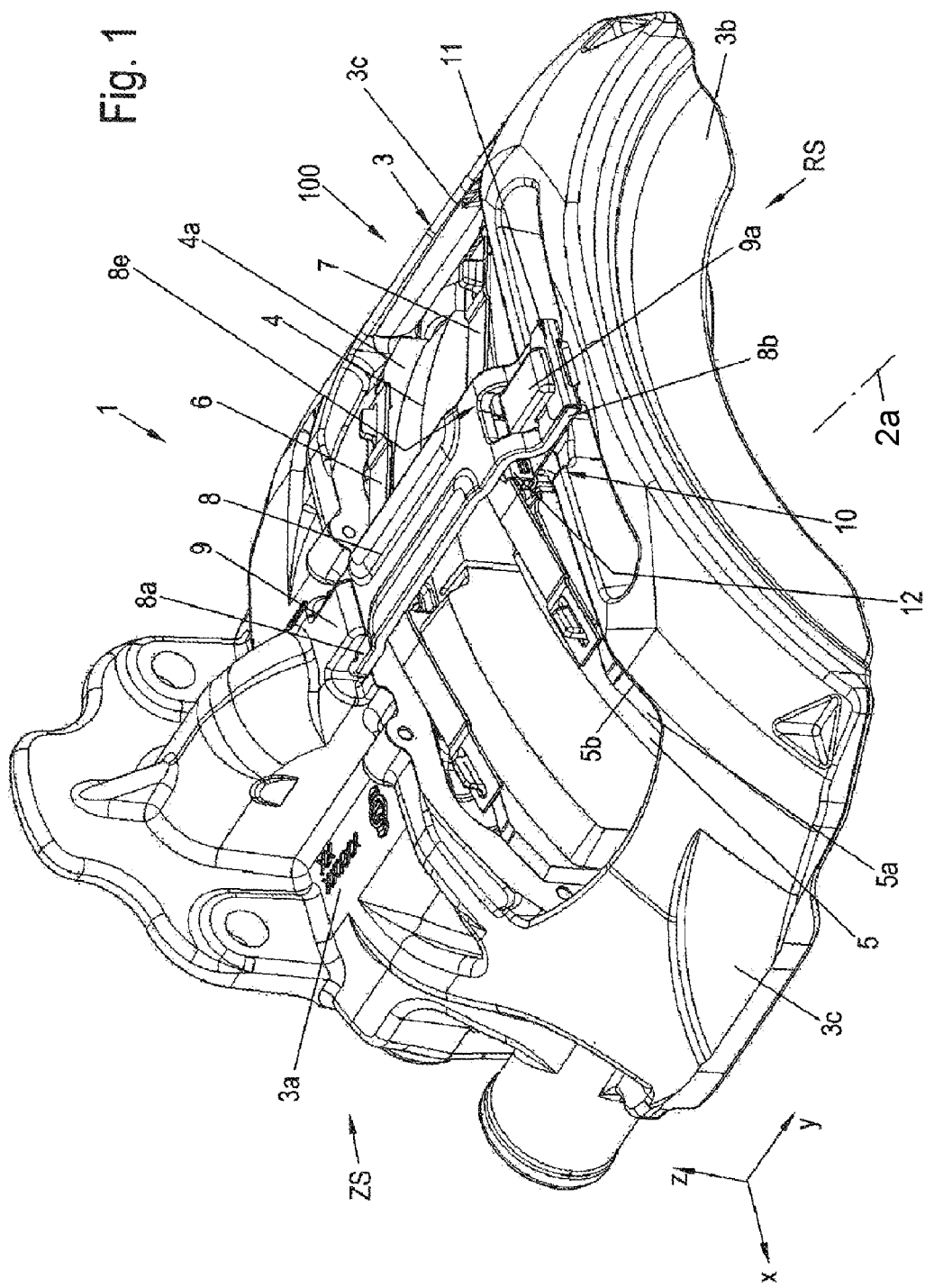
FIG. 1 shows a schematic perspective view of a disk brake according to the invention with a first embodiment of a securing device of the present invention.

FIG. 1 shows a schematic perspective view of a disk brake 1 according to the invention having a first embodiment of a securing device 10. The disk brake 1 is for example a pneumatic disk brake 1.

The disk brake 1 is assigned for example to a vehicle, in particular utility vehicle, and includes a brake disk (not shown here, but easily conceivable) with a brake disk axis of rotation 2 running in the y direction, a brake caliper 3, a brake carrier (not shown in any more detail), and at least two brake pads 4 and 5, which are applied in each case to a pad rear plate 4a, 5a. The brake pads 4 and 5 are received in the brake carrier in so-called pad slots and are held by way of a pad retaining clip 8, which will be described in more detail below.

The brake caliper 3 is in this case in the form of a sliding caliper, is held (in a manner not described in any more detail) on the brake carrier which is fixed so as to be positionally static, and has an application section 3a and a rear section 3b, which are connected to one another in the y direction at both ends in the y direction by way of connecting sections 3c. Here, the application section 3a and the rear section 3b are arranged in each case on one side of, and parallel to, the brake disk, which is normally situated between the brake pads 4 and 5, wherein the connecting sections 3c extend in the y direction parallel to the brake disk axis of rotation 2a. The application section 3a and the rear section 3b form, together with the connecting sections 3c, an opening over the brake disk 2 with the brake pads 4 and 5, for access to said brake pads during mounting, exchange and maintenance work.

The application section 3a of the brake caliper 3 accommodates an application mechanism of the disk brake 1. The application mechanism serves for the actuation of the disk brake 1 and may for example be a brake rotary lever with a compressed-air cylinder.

That side of the disk brake 1 on which the application section 3a of the brake caliper 3 with the application mechanism is arranged will hereinafter be referred to as application side Z. The other side of the disk brake 1, on which the rear section 3b of the brake caliper 3 is arranged, will hereinafter be referred to as rear side R, also referred to as reaction side. These expressions "application side" and "rear side" and further designations relating to these are customary and serve for better orientation.

Accordingly, the brake pad 4 with the pad rear plate 4a which is situated on the application side ZS is referred to as application-side brake pad 4, and the opposite brake pad is referred to as rear-side brake pad 5 with pad rear plate 5a.

During braking processes, the application-side brake pad 4 is acted on by the application mechanism with an application force in the y direction. The rear-side brake pad 5 is received in the rear section 3b of the brake caliper 3 and, in the case of this disk brake 1 with the brake caliper 3 of sliding-caliper design, does not perform any relative movements relative to the rear section 3b.

The brake pads 4 and 5 are each equipped, on the top sides of the pad rear plates 4a, 5a, with a pad retaining spring 6, 7, which pad retaining springs interact with the pad retaining clip 8. The pad retaining clip 8 extends in the y direction across the opening formed over the brake disk by the application section 3a, by the rear section 3b and by the connecting sections 3c, and said pad retaining clip is arranged over the installed brake pads 4, 5 so as to press against the top sides of the pad retaining springs 6, 7, and thus serves for securing the brake pads 4, 5 in the brake carrier. Here, the pad retaining clip 8 is received with an application-side end section 8a in a bearing section 9 of the application section 3a of the brake caliper 3, wherein an opposite end section 8b of the pad retaining clip 8 is connected to a retaining section 9a of the rear section 3b of the brake caliper 3. Here, said retaining section projects in the y direction from the top side of the rear section 3b and extends through an opening 8e of the pad retaining clip 8, the end section 8b of which is in this case arranged below the retaining section 9a, between the latter and the rear section 3b.

The pad retaining clip 8 is thus connected by the bearing section 9 and the retaining section 9a to the brake caliper 3 and is equipped with the securing device 10 such that said pad retaining clip on the one hand cannot be displaced in its installed position, for example by acting lateral forces, but on the other hand can be mounted and dismounted.

The securing device 10 is in this case arranged in the region of the rear-side brake pad 5. The securing device 10 includes a bracket element 11 and a retainer 12, 12'. In this first embodiment, the retainer 12 is formed as a clamp element.

The securing device 10 for securing the position of the pad retaining clip 8 forms a detachable connection between the pad retaining clip 8 and the pad rear plate 5a of the rear-side brake pad. In an installed state of the pad retaining clip 8, in each case at least one section of the at least one bracket element 11 is in engagement with at least one section of the retainer 12, 12'. Here, the at least one section of the at least one bracket element 11 is, during mounting/dismounting of the pad retaining clip 8, movable counter to a spring force of said at least one section of the at least one bracket element 11.

The securing device 10 will be described in more detail below.

The reference designation 100 denotes a brake pad set which comprises the two brake pads 4, 5 on the respective pad rear plate 4a, 5a, the associated pad retaining springs 6, 7, the pad retaining clip 8 and the securing device 10.

Figure 2:
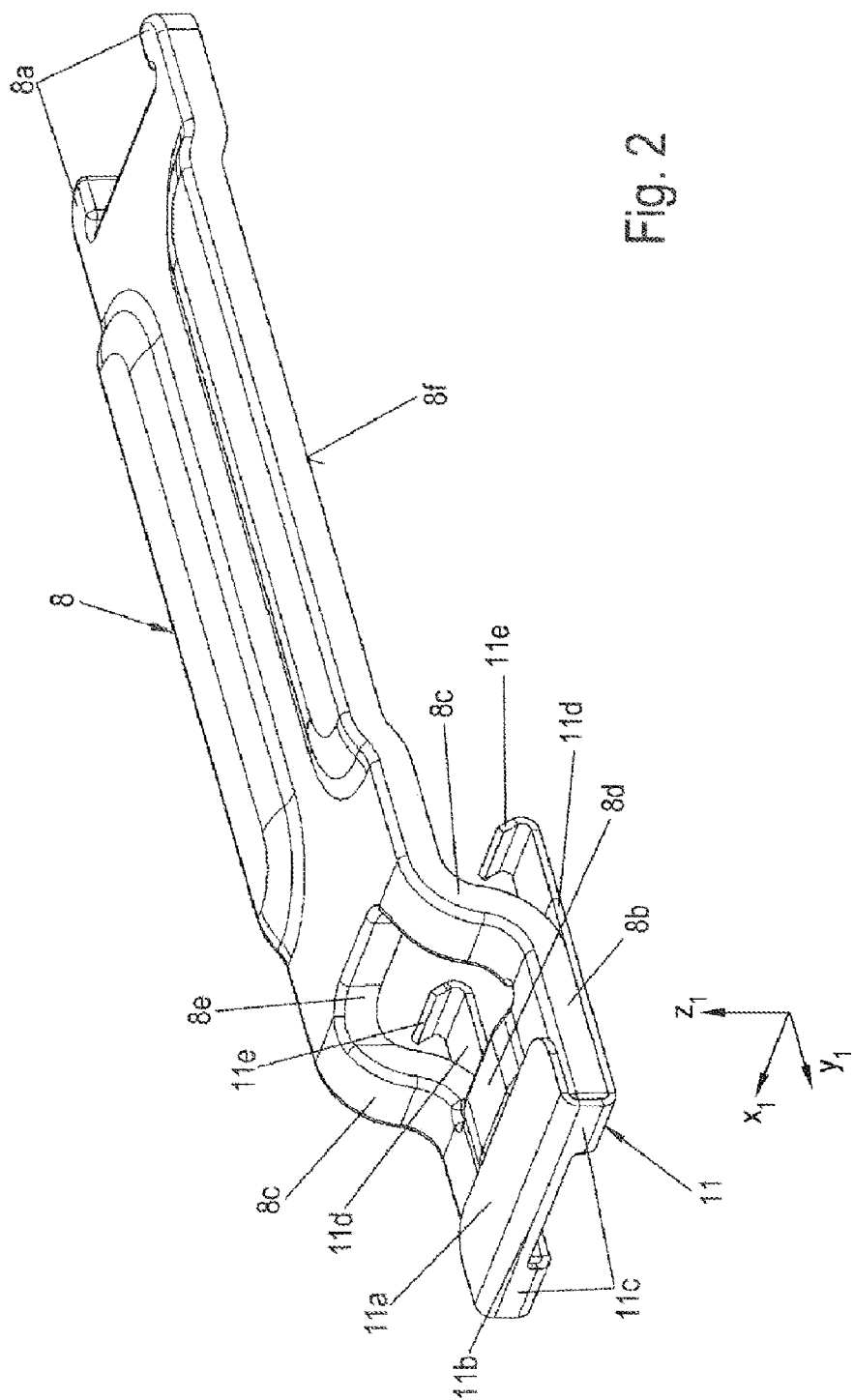
FIGS. 2-2A show various schematic perspective views of a pad retaining clip with a bracket element of the first embodiment of the securing device.
Figure 2A:
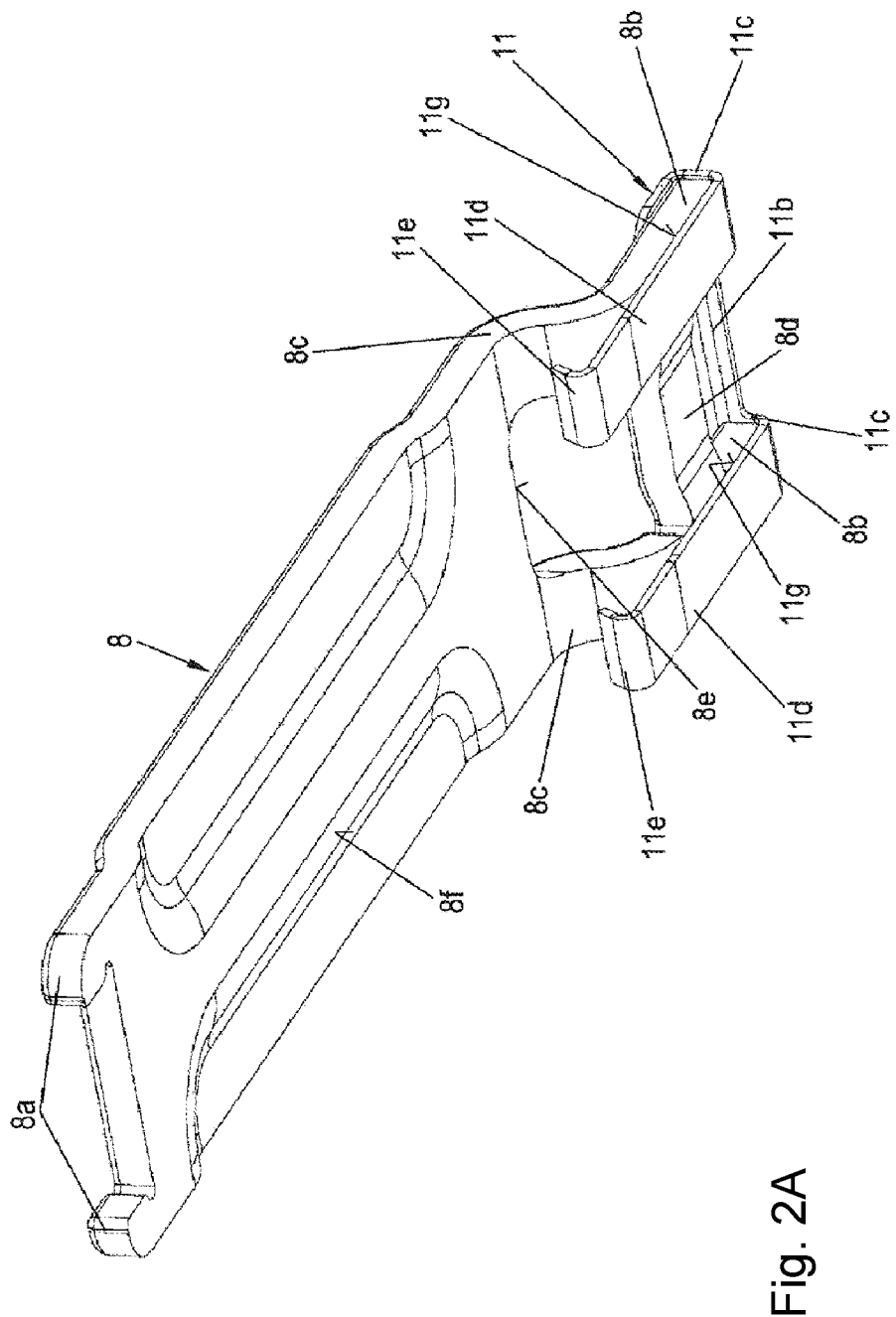
Figure 3:
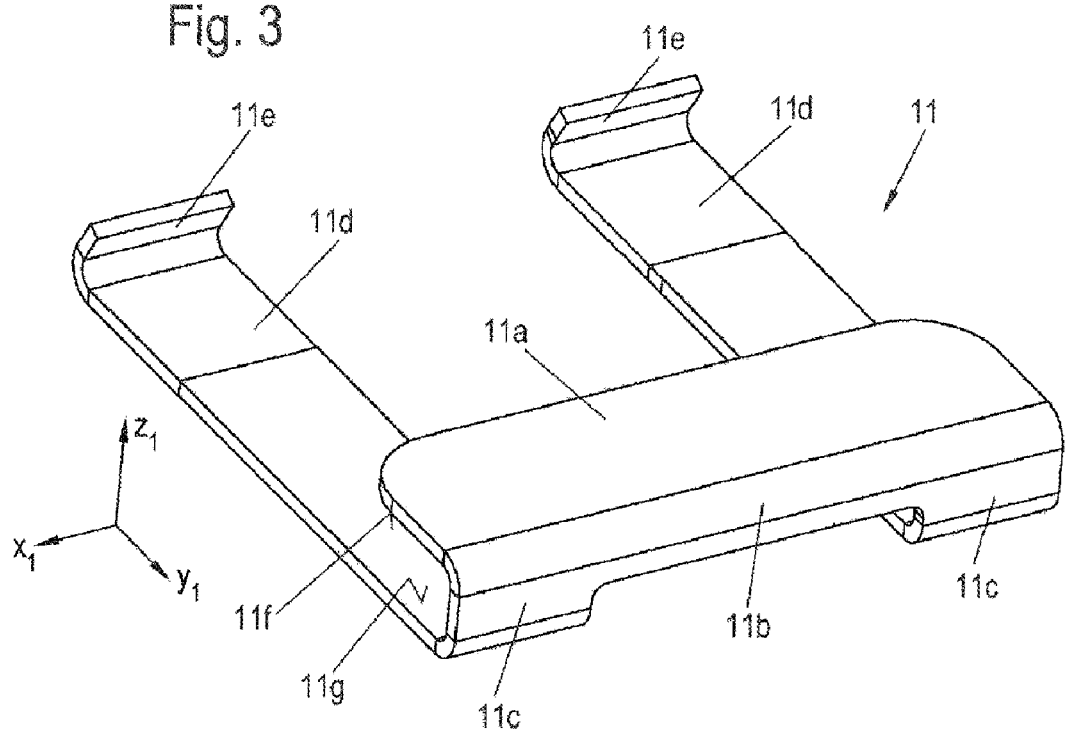
FIGS. 3-3A show various schematic perspective views of the bracket element of the first embodiment of the securing device.
Figure 3A:
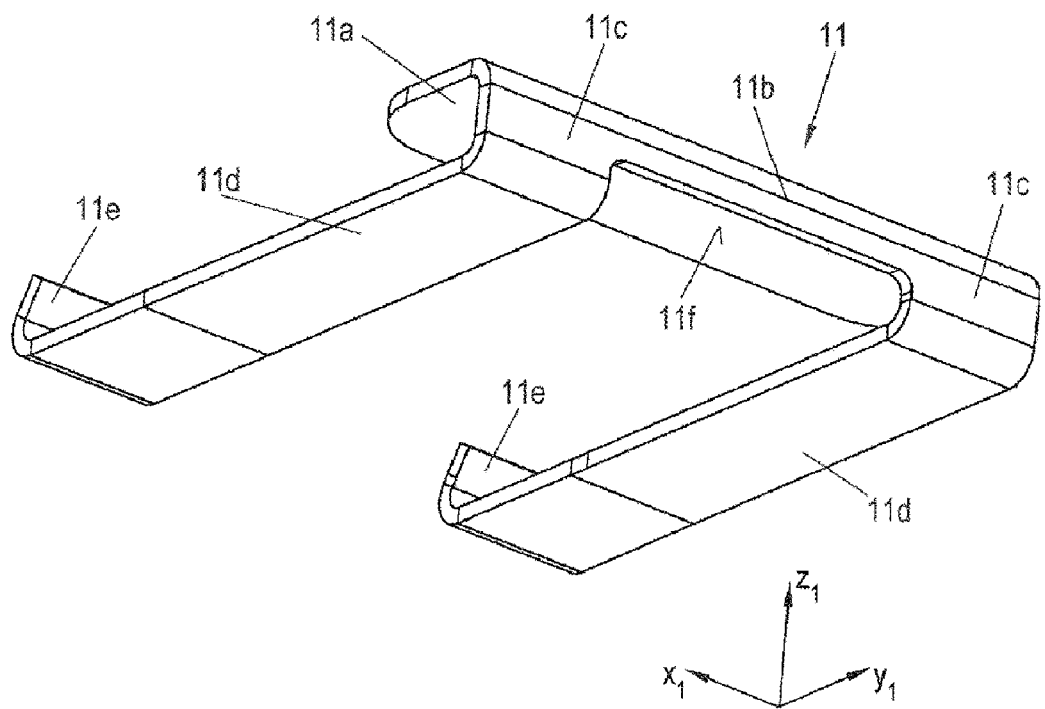

FIGS. 2-2A show different schematic perspective views of the pad retaining clip 8 with the bracket element 11 of the first embodiment of the securing device 10. FIGS. 3-3Aa illustrate different schematic perspective views of the bracket element 11 of the first embodiment of the securing device 10. Coordinates $x_1$, $y_1$, $z_1$ serve for orientation.

The pad retaining clip 8 is in this case formed such that its application-side end section 8b is of downwardly cranked form. Here, two transition sections 8c which are situated parallel to and spaced apart from one another are, in accordance with the cranked configuration, equipped with in each case one S-shaped bend. The respective lower ends of the S-shaped bends then run straight and substantially parallel to a surface 8f on the bottom side of the body of the pad retaining clip 8.

A transverse section 8d is arranged between the two straight sections of the free ends of the transition sections 8c and connects these. The transverse section 8d is arranged in each case approximately at the start of each straight section of the transition sections 8c.

Between the downwardly cranked transition sections 8c, there is formed a central opening 8e which is defined by the transition sections 8c, by an end of the body of the pad retaining clip 8 and by the transverse section 8d.

The bracket element 11 of the securing device 10 comprises a plate section 11a, face sections 11b and 11c and two arms 11d with in each case one hook-shaped end section 11e.

The plate section 11a runs in an $x_1$-$y_1$ plane, has in each case one rounded corner at its free longitudinal side, and transitions at the other longitudinal side into the face sections 11b and 11c. The face sections 11c are arranged on both sides of the face section 11b and, together with the central face section 11b, run in an $x_1$-$z_1$ plane at right angles to the plane of the plate section 11a. Transition regions between the plate section 11a and the face sections 11b and 11c are in this case of rounded design (for example owing to a bending process).

An extent of the lateral face sections 11c in the $z_1$ direction corresponds to the extent of the thickness of the straight ends of the transition sections 8c in the $z_1$ direction.

The central face section 11b ends approximately at the midpoint of the extent of the lateral face sections 11c in the $z_1$ direction.

Each lateral face section 11c is connected by a curved transition (for example also owing to a bending process) to the respective associated arm 11d, which extends in the negative $y_1$ direction parallel to the plate section 11a.

In this way, the plate section 11a and those sections of the arms 11d which run parallel thereto form a receptacle for the rear-side end section 8b of the pad retaining clip 8. If the bracket element 11 is attached to the end section 8b of the pad retaining clip 8 (see FIGS. 2 and 2Aa), sections of a surface 11f of the bottom side of the plate section 11a of the bracket element 11 are in contact with surface sections of the top side of the straight ends of the cranked transition sections 8c and (in part) of the transverse section 8d of the pad retaining clip 8, and surface sections of surfaces 11g of the top side of the arms 11b of the bracket element 11 are in contact with surface sections of the bottom side of the straight ends of the cranked transition sections 8c and (in part) of the transverse section 8d of the pad retaining clip 8. Face sides of the straight ends of the cranked transition sections 8c of the pad retaining clip 8 may, with corresponding adaptation of their edges at the rounded portions of the edgings of the bracket element 11, be in contact with the inner sides of the face sections 11b and 11c of the bracket element 11.

The bracket element 11 is attached to the application-side end section 8b of the pad retaining clip 8, wherein each arm 11d then extends parallel to the bottom side of the end section 8b in the negative y direction below the end section 8b as far as below the cranked form of the transition sections 8c of the pad retaining clip 8. The hook-shaped end sections 11e of the arms 11d are bent so as to be inclined upward and obliquely rearward, that is to say in the positive $y_1$ direction, toward the respective arm 11d, such that in the example shown, the value of an angle of inclination amounts to less than 90°. This angle of inclination may however also amount to 90°. A length of the end section 11e in the x direction corresponds to the length of the arm 11d in the x direction. The end sections 11e are provided for engagement with the retainer 12, in this case with the clamp element, of the securing device 10. This will be discussed in detail below.

The bracket element 11 may for example be a punched/bent part composed of a metallic material.

Figure 10:
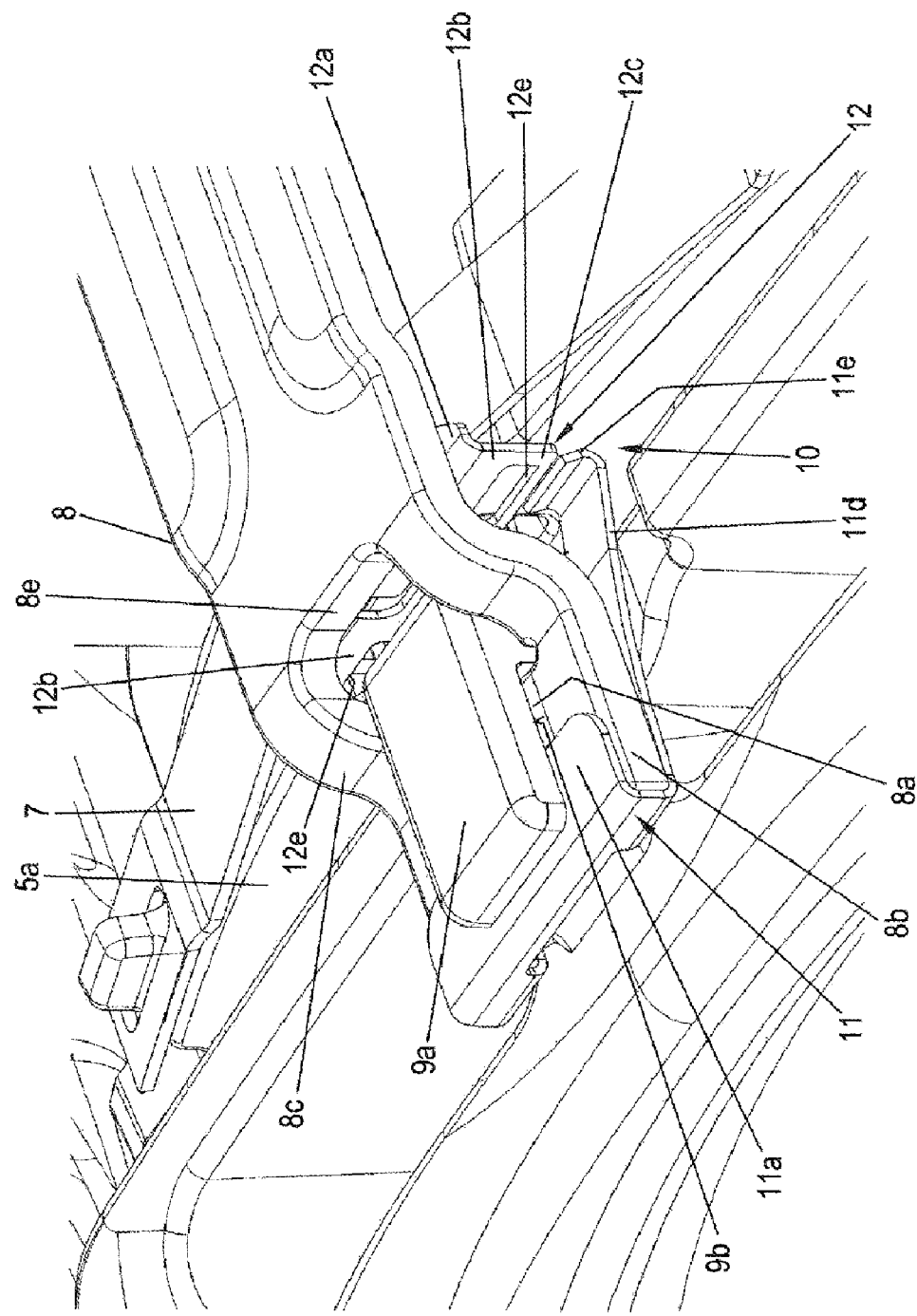

The bracket element 11 is fastened to the end section 8b of the pad retaining clip 8 such that the arms 11d can perform a resilient movement in the z direction. This "freedom of movement" is clearly shown in FIG. 10. Therefore, the bracket element 11 with its plate section 11a, the face sections 11b, 11c and also the short end regions, adjoining said face sections, of the arms 11*d* can be fastened as shown in FIG. 10 to the end section 8*b* of the pad retaining clip 8.

A fastening of the bracket element 11 to the end section 8*b* of the pad retaining clip 8 may also be conceivable without the plate section 11*a* and without the face sections 11*b* and 11*c*. Here, the surfaces 11*g* of the arms 11*d* may also be attached, for example welded, directly below the lateral end regions of the end section 8*b* of the pad retaining clip 8.

A fastening of the bracket element 11 to the pad retaining clip 8 may be realized for example by welding. Further types of attachment will be discussed in more detail below.

Figure 4:
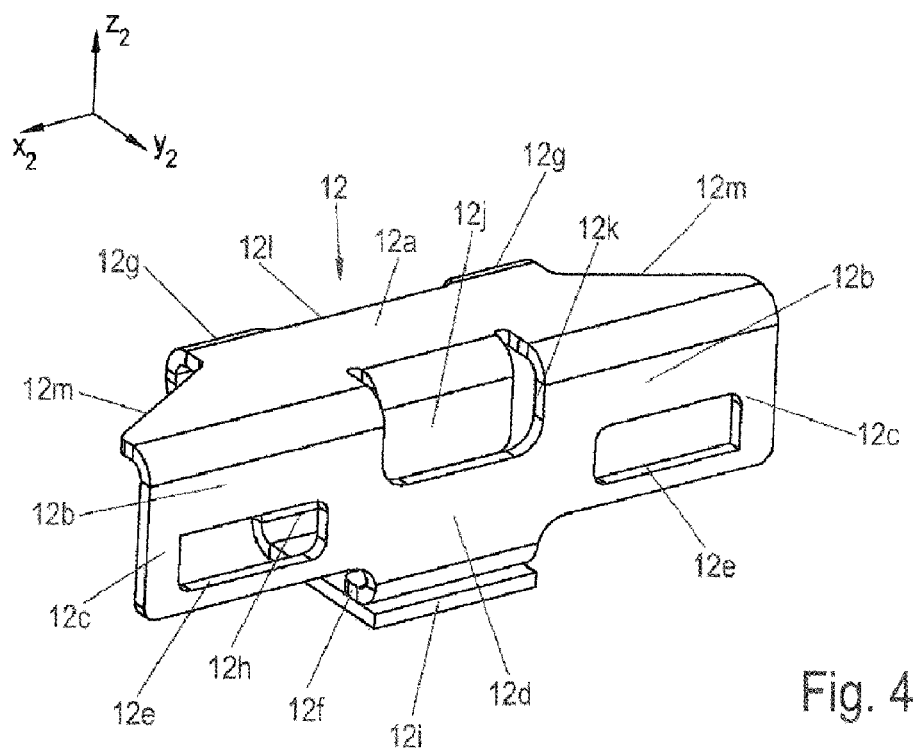
FIGS. 4-4A show various schematic perspective views of a retainer of the first embodiment of the securing device.
Figure 4A:
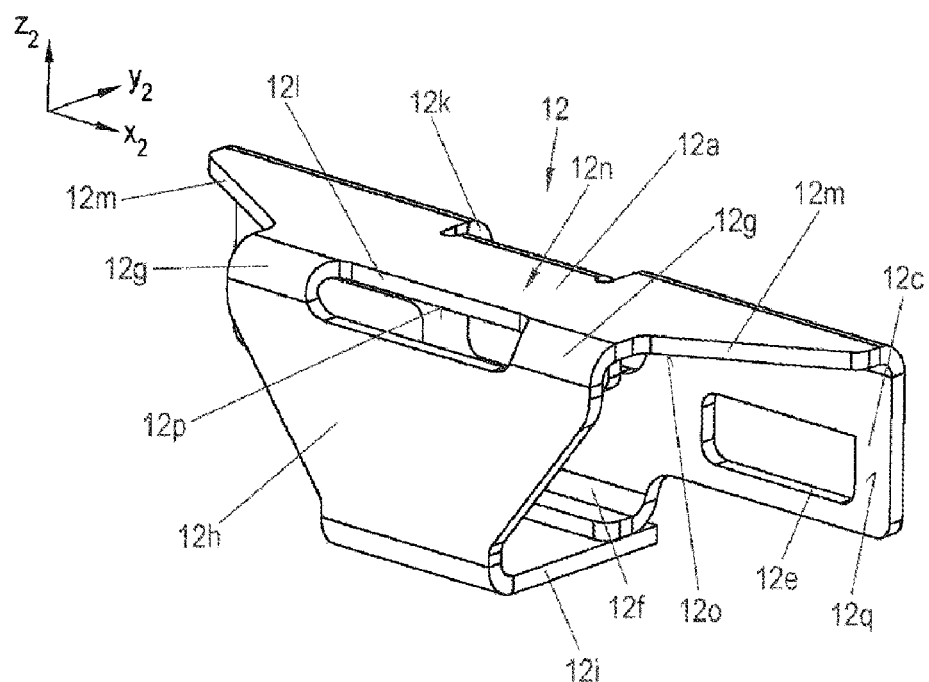

FIGS. 4-4A show various schematic views of the clamp element as retainer 12 of the first embodiment of the securing device 10. Coordinates $x_2$, $y_2$, $z_2$ serve for orientation.

FIGS. 5-7 show different schematic views of an brake pad 5*a* with the clamp element as retainer 12 of the first embodiment of the securing device 10.

The clamp element as retainer 12 of the securing device 10 comprises a plate section 12*a*, face sections 12*b* and 12*d*, a retaining section 12*c* with openings 12*e*, a connecting section 12*f*, transition sections 12*g*, a side section 12*h*, a lug section 12*i* and a lug 12*j*.

The plate section 12*a* is of substantially trapezoidal form and lies in an $x_2$-$y_2$ plane. The trapezoid has edges 12*m* as limbs. Two face sections 12*b* are laterally attached via curved transitions to the relatively long base side of said trapezium. The face sections 12*b* are spaced apart in the $x_2$ direction by a recess 12*k* and, at their lower sections, transition in each case into a lateral retaining section 12*c* with in each case one opening 12*e*. The lateral retaining sections 12*c* are connected to one another in the $x_z$ direction by the further, central face section 12*d*.

The face sections 12*b*, 12*d* and the lateral retaining sections 12*c* lie in an $x_2$-$z_2$ plane at right angles to the plane of the plate section 12*a*.

The openings 12*e* are of rectangular design and correspond in terms of their dimensions to the hook-shaped end sections 11*e* of the bracket element for the purposes of engagement with the latter. Here, the long sides of the rectangular openings 12*e* run in the $x_2$ direction.

The central face section 12*d* is connected at its bottom side via a curved transition to the connecting section 12*f*, which extends in the negative $y_2$ direction in an $x_2$-$y_2$ plane and is in contact with, and connected to, an end section of the lug section 12*i*. This connection is made, during the mounting of the clamp element 12 on the rear-side pad retaining plate 5*a*, only after the lug section 12*i* has been inserted into an opening 50 of the pad rear plate 5*a*. This will be described in more detail below.

Two transition sections 12*g* are laterally attached via curved transitions to the other, relatively short base side of the trapezoid shape of the plate section 12*a* of the clamp element as retainer 12. Said two lateral transition sections 12*g* are spaced apart in the $x_2$ direction by a recess 12*l*.

The transition sections 12*g* are connected at their lower sections to the side section 12*h*, which at its lower section is connected via a curved transition to the lug section 12*i*. The side section 12*h* is of trapezoidal form, wherein its relatively long base side is connected to the transition sections 12*g*, and its relatively short base side is connected to the lug section 12*i*. An extent of the lug section 12*i* in the $x_2$ direction corresponds substantially to the length of the relatively short base side of the trapezoidal side section 12*h*.

The side section 12*h* lies in an $x_2$-$z_2$ plane parallel to and spaced apart from the $x_2$-$z_2$ plane of the face sections 12*b*, 12*d* and of the retaining section 12*c*. The lug section 12*i* runs in an $x_2$-$y_2$ plane parallel to and spaced apart from the $x_2$-$y_2$ plane of the plate section 12*a*.

A lug 12*j* is arranged between the two lateral face sections 12*b* in the $x_2$ direction and is attached to the plate section 12*a* by a curved transition. The lug 12*j* may for example be produced by punching in the case of the clamp element being produced as a punched/bent part, wherein the recess 12*k* is formed between the lateral face sections 12*b*. The lug 12*j* is bent downward into an $x_2$-$z_2$ plane and is arranged in the negative $y_2$ direction between the face sections 12*b*, 12*d* and the side section 12*h*. The function thereof will be discussed in more detail below in conjunction with FIG. 7.

A bottom side of the plate section 12*a* is denoted by the reference designation 12*o*. The plate section 12*a* has, in its central region, a central section 12*n* with a bottom side 12*p*.

The retainer 12 is produced for example from a metallic material.

FIG. 5 shows the rear-side brake pad 5 with its pad rear plate 5*a* and mounted clamp element as retainer 12 from the pad side, wherein FIG. 6 illustrates the other side as viewed from the rear surface 5*b*. FIG. 7 is a sectional illustration with a view in the x direction onto a y-z plane in a central region of the mounted clamp element.

The clamp element as retainer 12 of the securing device 10 is attached to the top side of the rear-side pad rear plate 5*a* such that the face sections 12*b* with the retaining section 12*c* with the openings 12*e* are arranged on the rear surface 5*b*, averted from the brake disk, of the rear-side pad rear plate 5*a*, and such that the trapezoidal side section 12*h* is arranged on the pad side of the rear-side pad rear plate 5*a*.

Here, the clamp element furthermore extends with its face sections 12*g*, which transition into the side section 12*h*, and the recess 12*l* (see FIG. 5) through the passage opening 7*a* of the rear-side pad retaining spring 7.

Before the mounting of the clamp element as retainer 12, the lug section 12*i* and the connecting section 12*f* are not yet fixedly connected; rather, the clamp element 12 is, during the mounting process, initially widened or bent such that the lug section 12*i* can be inserted through the opening 50 in the pad rear plate 5*a* from the pad side. Then, the lug section 12*i* extends in the y direction through the opening 50, which extends all the way through in the y direction. The clamp element is then pushed together again, such that an end region of the lug section 12*i* and the connecting section 12*f* lie one above the other and can be connected. This connection may be realized for example by welding or deformation or the like.

For this purpose, the brake pad 5 has a corresponding cutout in the region of the opening 50, as can be seen from FIG. 5.

The clamp element as retainer 12 of the securing device 10 is furthermore attached to the top side of the rear-side pad rear plate 5*a* such that the bottom side 12*p* of the central section 12*n* of the plate section 12*a* is in contact with the top side of the pad retaining spring 7. Owing to the curvature of the pad retaining spring 7 and the oblique edges 12*m*, the top side of the pad retaining spring 7 is not in contact with the rest of the bottom side 12*p* of the plate section 12*a* of the clamp element. Furthermore, the edge region of the bottom side 12*p* of the central section 12*n* is exposed by the recess 12*l*. This has the advantage that an edge of the pad retaining spring 7 is exposed in this region and thus cannot be laterally contacted in an inner region of the edging of the bent material of the clamp element. This can be clearly seen in the sectional illustrations as per FIG. 7 and FIG. 11.

The function of the lug 12*j* will now be discussed in conjunction with FIG. 7. The lug 12*j* bears with its side pointing toward the brake disk against the rear surface 5b of the rear-side pad rear plate 5a, and thus forms a stop of the clamp element as retainer 12 in the negative y direction. A stop of the clamp element in the opposite direction, that is to say in the positive y direction, is formed by virtue of the inner side of the side section 12h of the clamp element bearing against that surface of the pad rear plate 5a which is situated opposite the rear surface 5b and which points toward the brake disk. In other words, the clamp element is attached to the rear-side pad rear plate 5a such that a web section 5c, which is arranged above the opening 50, of the pad rear plate 5a is received between the lug 12j of the clamp element 12 and the inner side of the side section 12h of the clamp element.

With the lug 12j, the face and retaining sections 12b, 12c, 12d can be situated further remote from the pad rear plate 5b in the positive y direction. Accordingly, the end sections 11e of the arms 11b of the bracket element 11 attached to the pad retaining clip 8 can latch between the retaining sections 12c of the clamp element 12 and the rear surface 5b of the pad rear plate 5a. Accordingly, the retaining sections 12c can be formed without openings 12e (see for example FIG. 17).

In this way, the clamp element as retainer 12 is fixed to the rear-side pad rear plate 5a, wherein the openings 12e are provided for interacting engagement with the hook-shaped end sections 11e of the bracket element 11 in order to secure the pad retaining clip 8 in the installed state. This will now be discussed in more detail.

Figure 9:
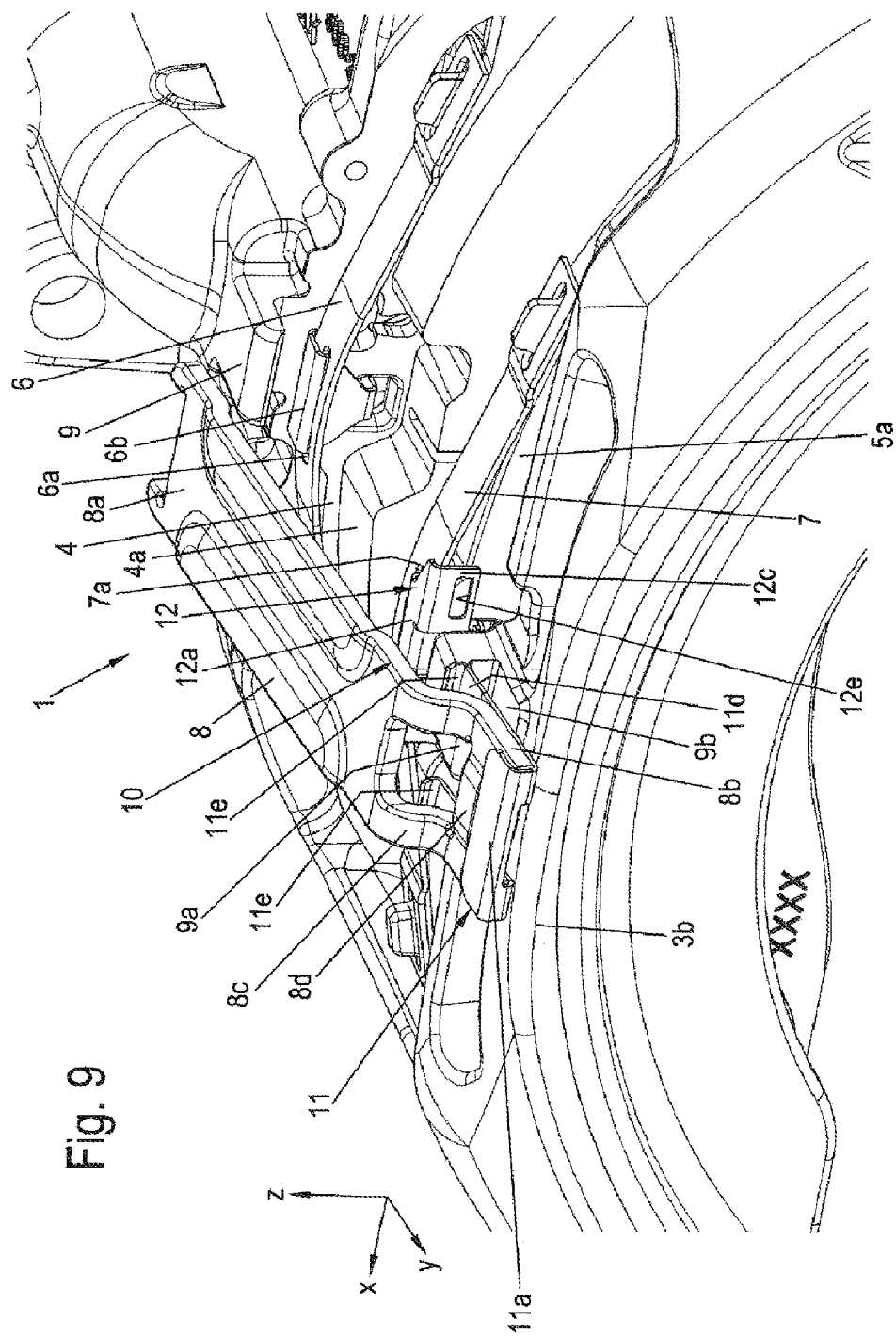
Figure 11:
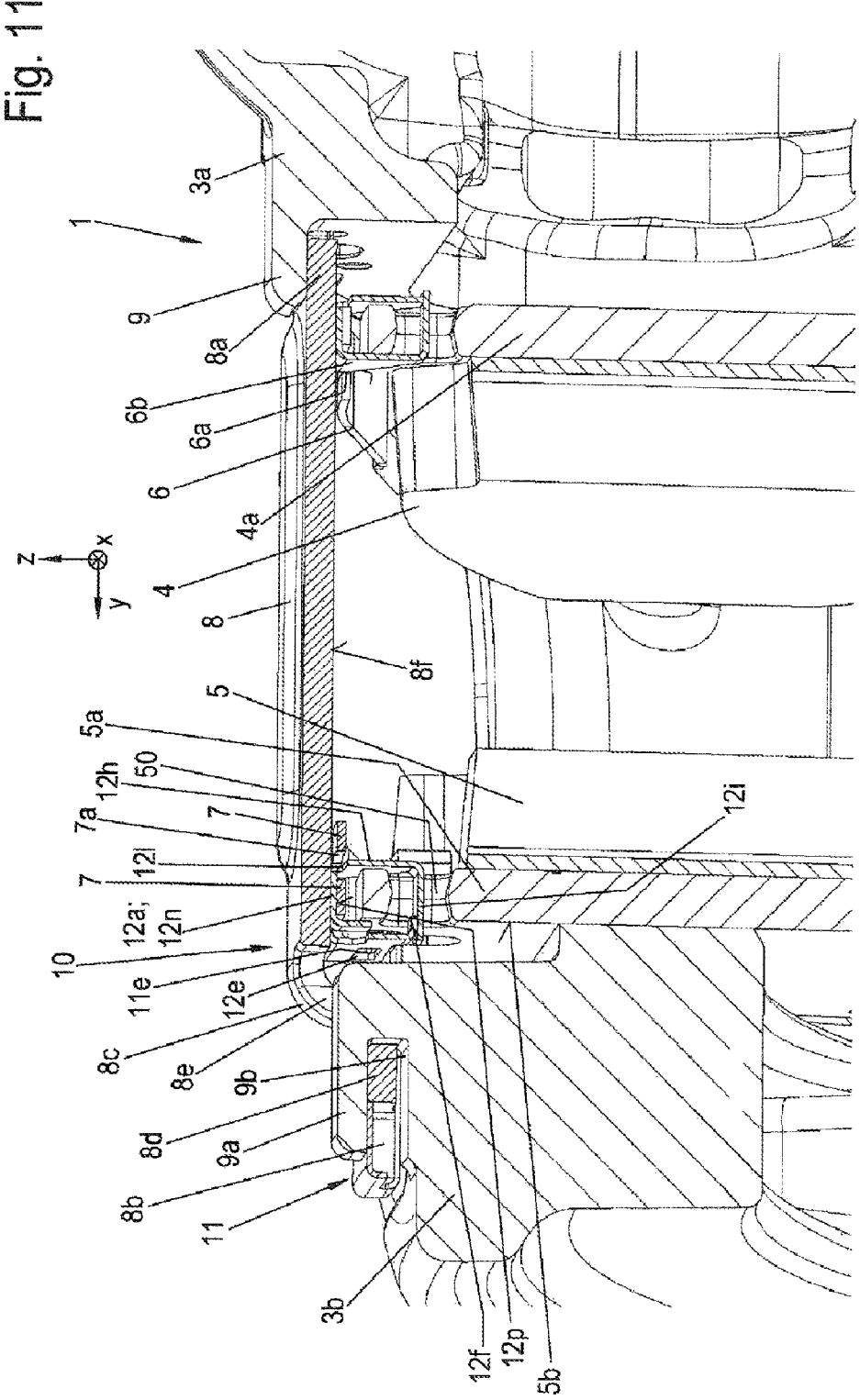
FIG. 11 shows a schematic sectional view of the disk brake according to the invention as per FIG. 1 in a y-z plane of a brake disk axis of rotation.

FIGS. 8 to 10 show different schematic perspective views of the disk brake 1 according to the invention as per FIG. 1 with installations of the pad retaining clip 8. FIG. 11 illustrates a schematic sectional view of the disk brake 1 according to the invention as per FIG. 1 in a y-z plane of the brake disk axis of rotation 2.

FIG. 8 illustrates a schematic perspective view of the top side of the disk brake 1 as seen from the application side ZS. The pad retaining clip 8 is shown before the installation thereof, above its installation location, that is to say above the opening which is formed by the application section 3a, the rear section 3b and the connecting sections 3c above the brake disk with the brake pads 4 and 5. FIG. 9 shows this situation as seen from the rear side RS. FIG. 10 shows the rear-side end section 8b of the pad retaining clip 8 in an enlarged illustration in an installation situation shortly before an engagement of bracket element 11 and clamp element as retainer 12, wherein FIG. 11 shows a sectional view of the disk brake 1 with the pad retaining clip 8 in the installed state.

The pad retaining springs 6 and 7 are attached to the top side of the respective pad rear plate 4a, 4b, wherein said pad retaining springs are captively retained. For this purpose, each pad retaining spring 6 has, in a central region, a slot-like passage opening 6a, 7a. The application-side pad retaining spring 6 is held movably on the application-side pad rear plate 4a by a spring retainer 6b, which extends through the slot-like passage opening 6a of the application-side pad retaining spring 6. Similarly, the rear-side pad retaining spring 7 is held by the clamp element as retainer 12 of the securing device 10. This has already been described in detail above.

In the installed state of the pad retaining clip 8, this presses with its surface 8f of its bottom side both against the application-side spring retainer 6b and thus against the application-side pad retaining spring 6 and also against the plate section 12a of the clamp element as retainer 12 and thus also against the rear-side pad retaining spring 7. This can be clearly seen in the sectional view in FIG. 11.

The securing device 10 makes it possible for the pad retaining clip 8 to be installed and uninstalled. During the installation process, the pad retaining clip 8 is inserted with its application-side end section 8a in the negative y direction into the bearing section 9, provided for the purpose and corresponding thereto, on the application section 3a of the brake caliper 3. Here, the rear-side end section 8b of the pad retaining clip 8 is placed in engagement with the retaining section 9a on the reaction section 3b of the brake caliper 3 such that the retaining section 9a extends through the opening 8e between the transition sections 8c on the rear-side end of the pad retaining clip 8. A transverse section 8d is received in a receptacle 9b below the retaining section 9a, between the latter and the reaction section 3b of the brake caliper 3.

Then, the front sides of the hook-shaped end sections 11e, which are bent obliquely upward and rearward in the y direction, of the bracket element 11 abut against the lower edge of the retaining section 12c of the clamp element as retainer 12 (see FIG. 10), and the arms 11d of the bracket element 11 are thereby pushed resiliently downward. As the pad retaining clip 8 is pushed further in the negative y direction, that is to say in the direction of the brake disk, when the end sections 11e have passed the lower edge of the retaining section 12c of the clamp element, the arms 11d spring back upward, wherein the hook-shaped end sections 11e of the bracket element 11 enter into engagement in each case with an opening 12e of the retaining section 12c of the clamp element from the side of the rear surface 5b of the rear-side pad rear plate 5a. If the pad retaining clip 8 is now pulled in the positive y direction, it will, owing to the hook-shaped end sections 11e engaged into the openings 12e, be retained by the clamp element as retainer 12, which is fastened to the pad rear plate 5a. Thus, the pad retaining clip 8 is arrested in the positive y direction. This state is shown in a sectional illustration in FIG. 11.

It is self-evidently also possible for the hook-shaped end sections 11e with the arms 11d of the bracket element 11 to be pushed downward manually and/or using a tool both during installation and during uninstallation.

For an installation of the pad retaining clip 8, it is then necessary for the pad retaining clip to be pushed in the negative y direction and for the resilient arms 11d to be pushed downward in order to release the engagement of the hook-shaped end sections 11e with the openings 12e of the retaining section 12c of the clamp element as retainer 12. Then, the pad retaining clip 8 can be dismounted in the positive y direction in the reverse sequence in relation to that described above. A simple tool may be used for pushing down the resilient arms 11d of the bracket element 11.

Figure 12:
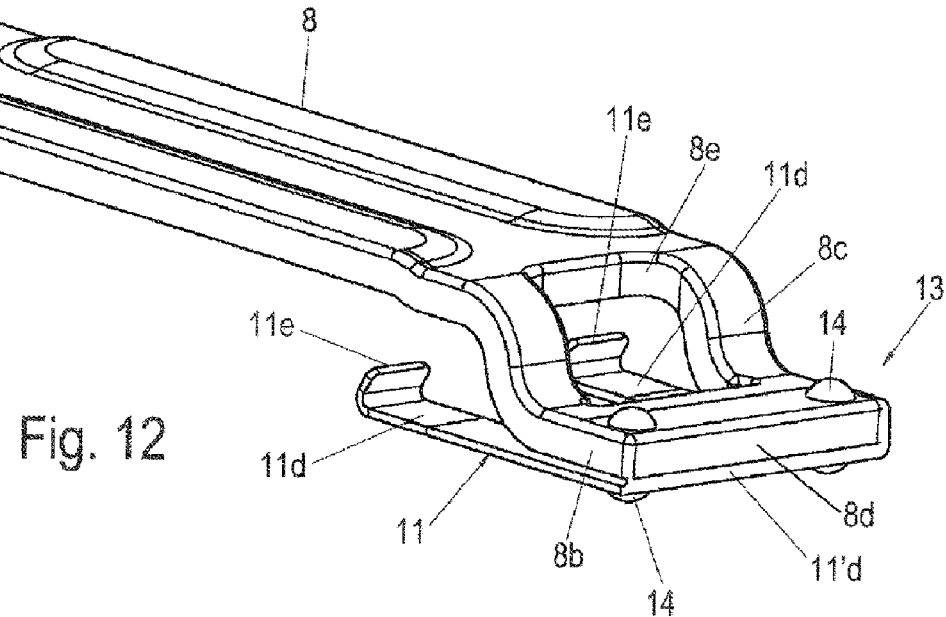
FIGS. 12-12C show schematic perspective views of fastenings of bracket elements of the first embodiment of the securing device to the pad retaining clip.
Figure 12A:
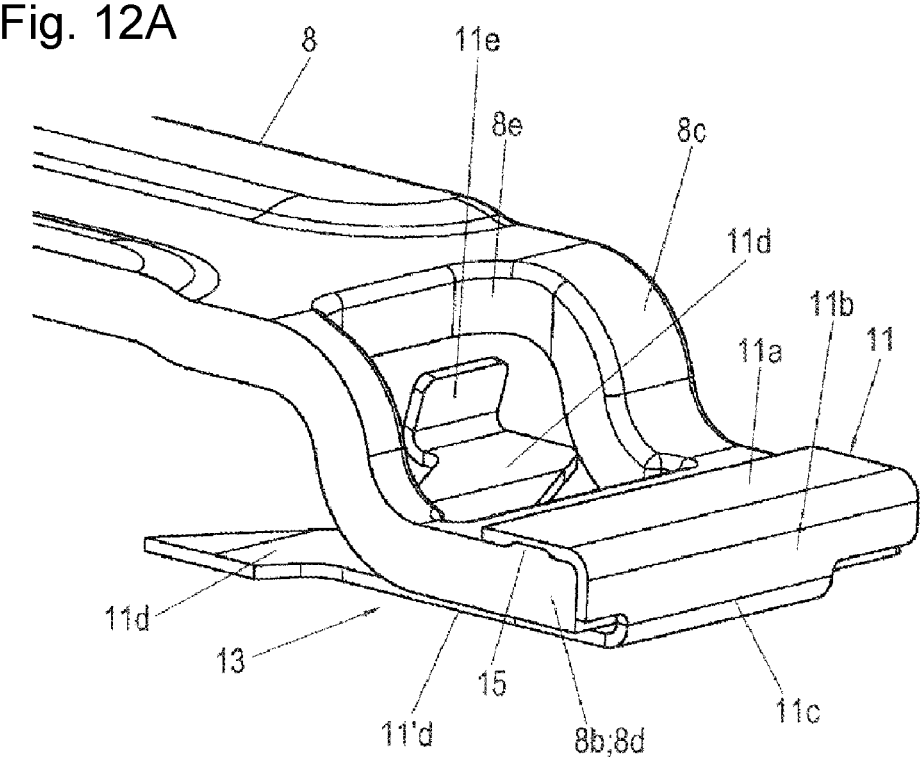
Figure 12B:
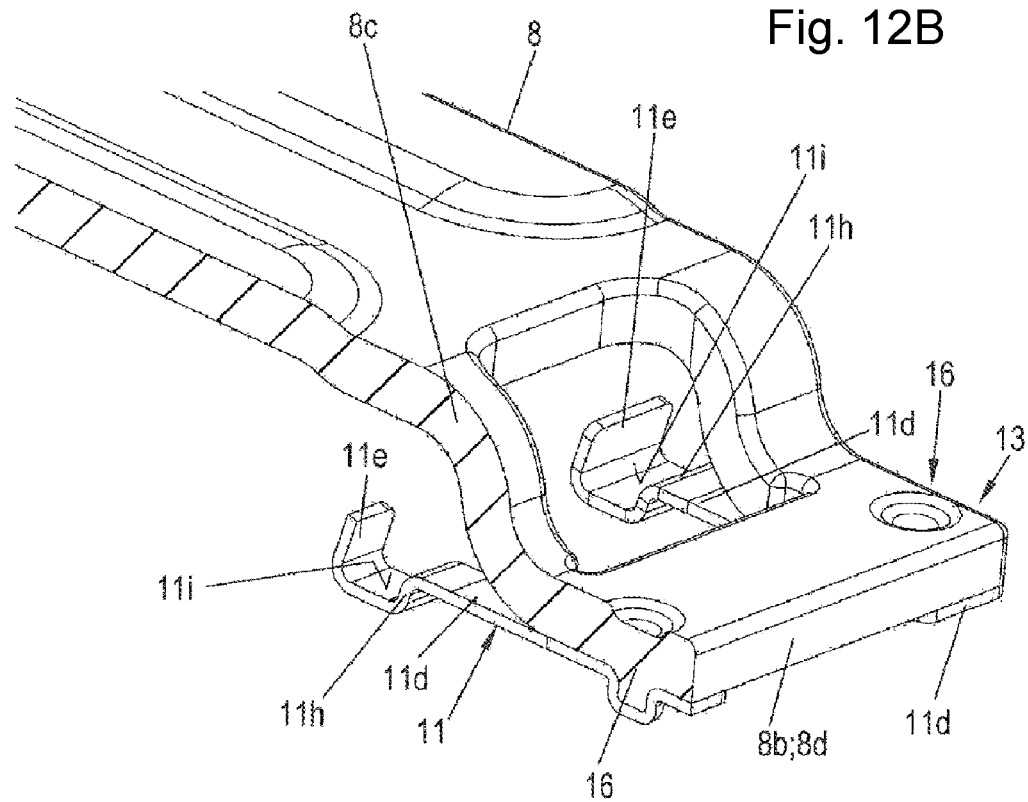
Figure 12C:
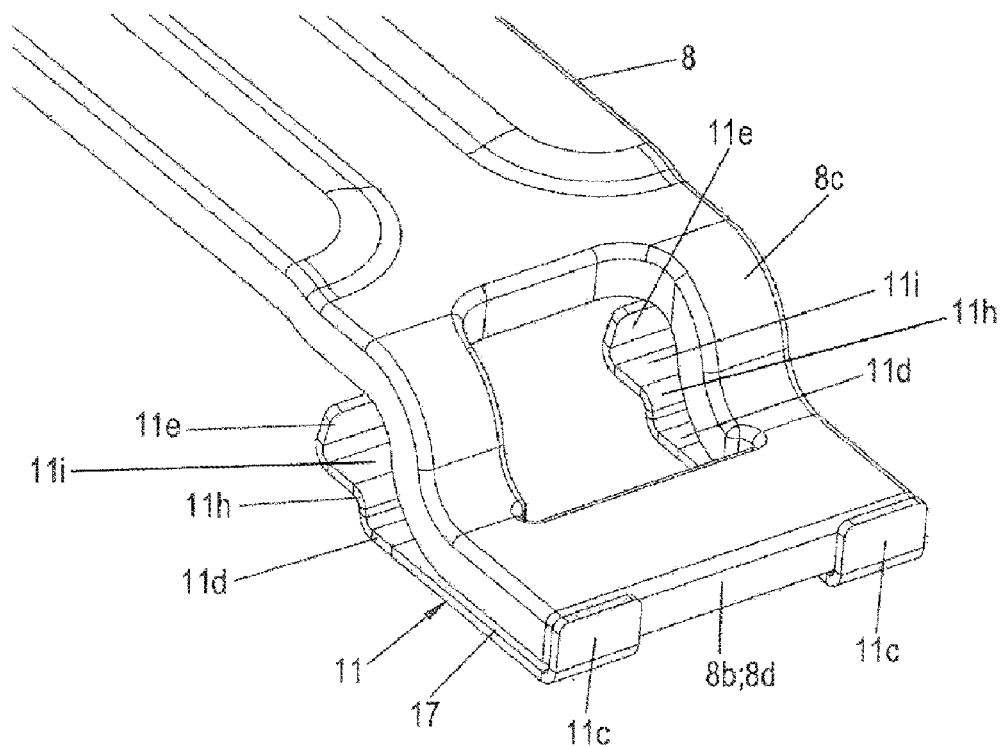

FIGS. 12 to 12C show schematic perspective views of fastenings of bracket elements 11 of the first embodiment of the securing device 10 to the pad retaining clip 8.

FIG. 12 shows a type of connection by a fastening 13 using connecting elements 14, which in this case are in the form of rivets.

The end section 8b of the pad retaining clip 8 has a transverse section 8d which extends in the longitudinal direction of the pad retaining clip 8 as far as the ends of the transition sections 8c and which terminates in alignment with said ends.

In this variant, the bracket element 11 has only the arms 11d with the hook-shaped end sections 11e. The arms 11d are connected with their ends to one another by an arm plate 11d' in the region of the end section 8b of the pad retaining clip 8. The arm plate 11d' and adjoining sections of the arms 11d are arranged below the end section 8b or the transverse section 8*d*, and are connected here by means of two connecting elements 14. It is to be noted that the connection with the bracket element 11 to the end section 8*b* is realized in the end region thereof, such that the "freedom of movement" of a resilient movement in the z direction of the arms 11*d* is ensured. The connecting elements 14 extend through passage bores through the end section 8*b* or the transverse section 8*d*, and are fixed from both sides as rivets.

In the variant illustrated in FIG. 12A, the fastening 13 is realized by stamping.

The end section 8*b* of the pad retaining clip 8 is formed with the transverse section 8*d* as in the variant as per FIG. 12, but without passage bores. A stamping section 15 on the transverse section 8*d* of the pad carrier 8 is connected, by stamping by a suitable stamping tool, to the plate section 11*a* of the bracket element 11, and forms a firm connection between the bracket element 11 and pad retaining clip 8. In this way, only the plate section 11*a* is fastened to the transverse section 8*d*, whereby the "freedom of movement" of the arms 11*d* of the bracket element 11 is ensured.

The bracket element 11 is shown here in a further variant. Here, the face section 11*b* extends over the entire length of the face surface of the end section 8*b* or transverse section 8*d* of the pad retaining clip 8 and is connected by a relatively narrow, bent face section 11*c* to an arm plate 11'*d*, which bears against the bottom side of the end section 8*b* or transverse section 8*d* of the pad retaining clip 8.

The arm plate 11'*d* extends further toward the brake disk and branches into obliquely projecting arms 11*d* with the hook-shaped end sections 11*e*.

FIG. 12B shows a variant with a fastening 13 produced by a so-called clinching method.

In this case, too, the end section 8*b* of the pad retaining clip 8 is formed with the transverse section 8*d* as in the variant as per FIG. 12A, without passage bores. A respective deformation 16 of the transverse section 8*d* of the pad carrier 8 with an arm 11*d* of the bracket element 11 by a suitable clinching tool yields a firm connection between bracket element 11 and pad retaining clip 8. This can be seen in the longitudinal section, in FIG. 12B, of the left-hand side of the pad retaining clip 8.

The bracket element 11 is illustrated here in a yet further variant. Said bracket element has only the two arms 11*d*, which are individually attached to the end section 8*b*. It is possible for the two arms 11*d* to be connected to one another below the end section 8*b* by an arm plate (not shown here, but easily conceivable).

To ensure the above-described "freedom of movement" of the arms 11*d*, the fastening thereof to the deformations 16 is arranged in the region of the front ends thereof.

In this variant of the bracket element 11, the end sections 11*e* are attached to the associated arm 11*d* in each case by a cranked portion 11*h*. The cranked portion 11*h* points downward and is connected via a short contact section 11*i* to the hook-shaped end section 11*e*. The short contact section 11*i* runs with its surface approximately parallel to the surface of the associated arm 11*d*. This variant with the short contact section 11*i* can be used for different engagement configurations in the case of different retainer 12, 12', as will be described in more detail below.

FIG. 12C illustrates a yet further variant with a welded connection as fastening 13.

Here, the end section 8*b* of the pad retaining clip 8 is likewise formed with the transverse section 8*d*, as in the variants as per FIG. 12*a*, 12*b* without passage bores.

The bracket element 11 has in this case only the two arms 11*d*, which are individually welded with their upwardly folded face sections 11*c* to the face side of the end section 8*b*. The "freedom of movement" of the arms 11*d* of the bracket element 11 is thus ensured. It is self-evidently also possible here for the two arms 11*d* to be connected to one another below the end section 8*b* by an arm plate (not shown here, but easily conceivable).

It is however also conceivable here for a fastening of the two arms 11*d* of the bracket element 11 to the end section 8*b* of the pad retaining clip 8 to be possible without the face sections 11*b* and 11*c*. Here, the surfaces 11*g* of the arms 11*d* are then attached, for example by welding, directly under the lateral end regions of the end section 8*b* of the pad retaining clip 8.

FIG. 12C shows the bracket element 11 with a further possibility of the design of the ends of the arms 11*d* with the end sections 11*e*, wherein here, the cranked portion 11*h* points upward. The cranked portion 11*h* is connected via a short contact section 11*i* to the hook-shaped end section 11*e*. The short contact section 11*i* runs with its surface approximately parallel to the surface of the associated arm 11*d*.

Figure 13:
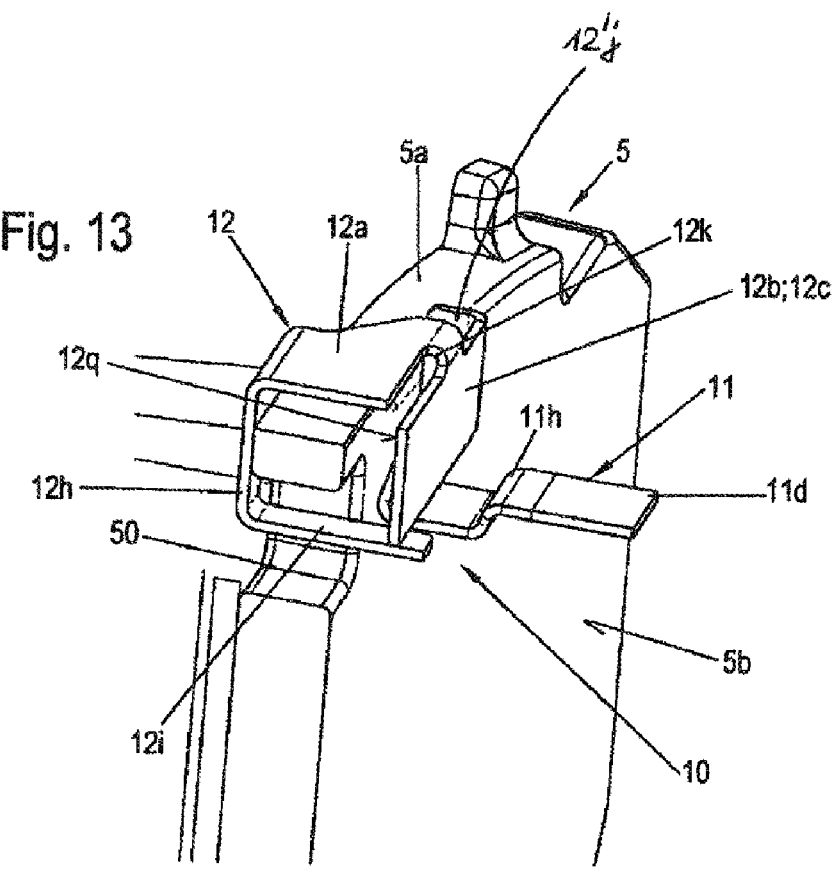
FIG. 13 shows a schematic perspective sectional view of a brake pad with a variant of the clamp element in accordance with an embodiment of the present invention.

FIG. 13 illustrates a perspective sectional view of the rear-side brake pad 5 according to the invention with a variant of the clamp element as retainer 12.

The clamp element as retainer 12 is, in this variant of the securing device 10, designed for interaction with the end sections 11*e* of the variant of the bracket element 11 as per FIG. 12B. The clamp element as retainer 12 has already been described in detail above in conjunction with FIGS. 4 to 7. Here, only the differences in relation thereto will be discussed below.

The face section 12*b* is formed as a continuous plate without openings 12*e* as retaining section 12*c*, wherein an inner side of the face section 12*b* performs the function of a retaining surface 12*q*. The inner side of the face section 12*b* is to be understood to mean that side of the face section 12*b* which points toward the rear surface 5*b* of the associated pad rear plate 5.

Here, the lug section 12*i* extends all the way through the opening 50 and, after the mounting process, is connected, for example welded, to a lower edge of the face section 12. The face section 12*b* may for this purpose also have a connecting section 12*f*, which is not shown here.

A lug 12*j* with the above-described function may likewise be provided. This function may however also be performed by a lug 12'*j*. Said lug 12'*j* is attached to an outer side of the face section 12*b* or retaining section 12*c* such that said lug 12'*j* is bent about the z direction so as to point toward the rear surface 5*b* of the pad rear plate 5*a*. FIG. 13 shows only the lug 12'*j* at one side; the other side is likewise equipped with a lug 12'*j* of said type, as is easily conceivable (see also FIG. 23).

The face section 12*b* furthermore has the above-described recess 12*k*.

In the assembled state, that is to say when the bracket element 11 is in engagement with the clamp element as retainer 12, the lower edge of the face section 12*b*/retaining section 12*c* is in contact with the contact section 11*i* of the respective arm 11*d* of the bracket element 11. In this state, it is furthermore the case that the respective hook-shaped end section 11*e* of the bracket element 11 is arranged behind the face section 12*b*, that is to say between the face section 12*b* and the rear surface 5*b* of the pad rear plate 5. Here, contact of the respective hook-shaped end section 11*e* with the retaining surface 12*q* has the effect of arresting the bracket element 11 and thus the pad retaining clip 8 connected thereto, in the longitudinal direction thereof The engagement of the hook-shaped end sections 11e of the bracket element 11 occurs during the above-described installation of the pad retaining clip 8, wherein the resilient arms 11d of the bracket element 11 are pushed downward by the slope of the end sections 11e in interaction with the lower edge of the face section 12b/retaining section 12c of the clamp element as retainer 12, and said resilient arms spring back upward again behind the face section 12b/retaining section 12c after passing the lower edge of the face section 12b/retaining section 12c. Uninstallation takes place as already described above.

Here, too, it is possible for the hook-shaped end sections 11e with the arms 11d of the bracket element 11 to be pushed downward manually and/or using a tool both during installation and during uninstallation.

Figure 14:
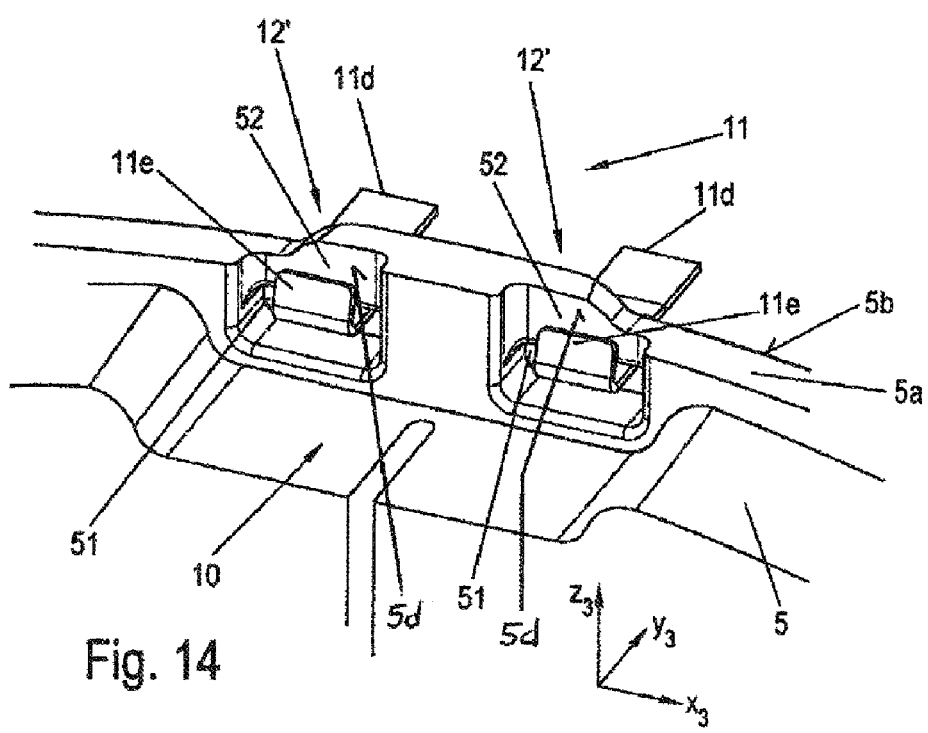
FIG. 14 shows a schematic perspective view of the brake pad with a second embodiment of the securing device of the present invention.

FIG. 14 shows a schematic perspective view of the brake pad 5 with a second embodiment of the securing device 10.

In this second embodiment of the securing device 10, the retainer 12' is integrated into the rear-side pad rear plate 5a.

The retainer 12' integrated into the pad rear plate 5a comprises in this case two through openings 51, with web sections 5c and recesses 52.

The openings 51 are formed as through openings 51, for example with a rectangular cross section, running in the $y_3$ direction in the upper region of the pad rear plate 5a. The $y_3$ direction corresponds in this case to the y direction from FIG. 1 and runs in the direction of the brake disk axis of rotation 2. The web sections 5c form in each case an upper delimitation of each opening 51. The recesses 52 are formed on the pad side of the pad rear plate 5a around the openings 51 into the pad rear plate 5a, whereby a thickness of the web sections 5c in this region in the $y_3$ direction is reduced to approximately half of a thickness of the pad rear plate 5a, and retaining surfaces 5d are formed. The retaining surfaces 5d point toward the brake disk.

The engagement of the hook-shaped end sections 11e of the bracket element 11 takes place during the installation, already described above, of the pad retaining clip 8 in that the resilient arms 11d of the bracket element 11 are pushed downward by the slope of the end sections 11e in interaction with rounded upper edges of the openings 51 on the side of the rear surface 5b during the sliding of the pad retaining clip 8 in the negative $y_3$ direction, or manually without or with a tool, and spring back upward after passing through the through openings 51 in the recesses 52. Here, the hook-shaped end sections 11e of the bracket element 11 are arranged in front of the retaining surfaces 5d of the web sections 5c and thereby prevent a pulling-out movement of the bracket element 11 and thus of the pad retaining clip 8 in the $y_3$ direction. Thus, by using the securing device 10, the pad retaining clip 8 is secured against being pulled out. Uninstallation takes place as already described above.

A retainer of the rear-side pad retaining spring 7 is not shown here, but may be formed for example in the manner of the spring retainer 6b as per FIG. 8 of the application-side pad retaining spring 6.

Figure 15:
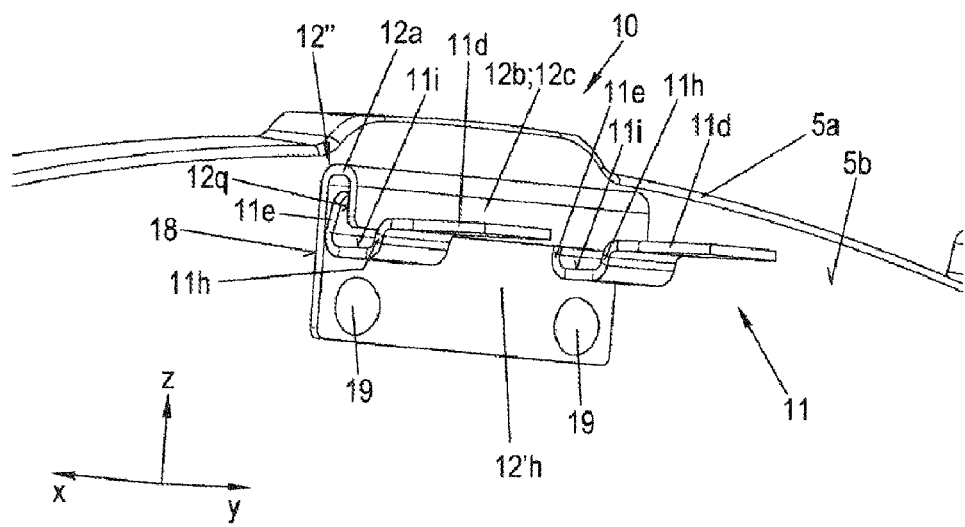
FIGS. 15-16 show schematic perspective views of variants of the first embodiment of the securing device.
Figure 16:
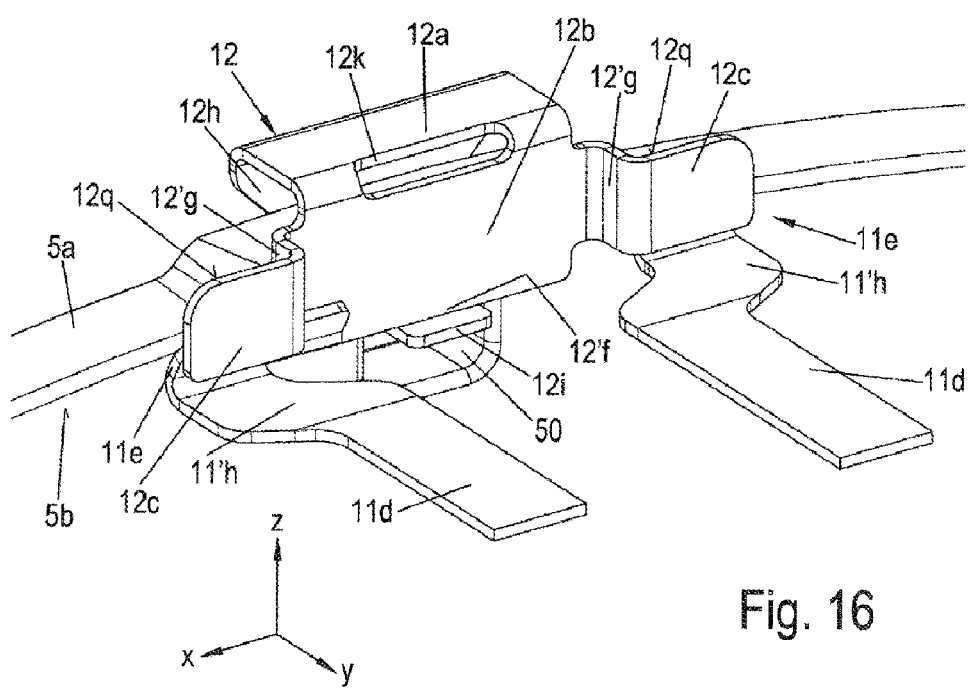

FIGS. 15 and 16 show schematic perspective views of variants of the first embodiment of the securing device 10.

FIG. 15 shows a retainer 12" which is attached to the rear surface 5b of the rear-side pad rear plate 5a. The retainer 12" comprises a plate section 12a, a face section 12b with a retaining section 12c, and a side section 12'h.

The retainer 12" is formed for example for interacting with the end sections 11e of the variant of the bracket element 11 as per FIG. 12b.

The plate section 12a has, on its first longitudinal side which projects from the rear surface 5b in the positive y direction, a face section 12b which simultaneously forms a retaining section 12c. The side section 12'h is attached to the other longitudinal side of the plate section 12a and runs in its x-z plane parallel to the x-z plane of the face section 12b/retaining section 12c. The face section 12b/retaining section 12c has an extent in the negative z direction which corresponds approximately to one third of the extent of the side section 12'h in the negative z direction.

The retainer 12" is fastened by the side section 12'h to the rear surface 5b of the pad rear plate 5a by fastening elements 19, for example rivets. Two fastening elements 19 are shown here. Other fastening types are self-evidently also possible. The side section 12'h lies with a fastening surface 18 on the rear surface 5b.

The plate section 12a is of relatively narrow form in the y direction, wherein the expression "narrow" is to be understood to mean a dimension which corresponds to the end sections 11e of the bracket element 11 such that the end sections 11e can, after passing the lower edge of the face section 12b/retaining section 12c during the mounting process, be easily arranged in the z direction between the side section 12'h and the face section 12b/retaining section 12c by virtue of the arms 11d of the bracket element 11 springing upward.

In the above-described mounted state of the pad retaining clip 8, the end sections 11e are in contact with a retaining surface 12q of the face section 12b/retaining section 12c, which retaining surface points toward the side section 12'h. In this way, arresting and securing of the pad retaining clip 8 in the y direction is ensured.

A retainer of the rear-side pad retaining spring 7 is not shown here, though may be formed for example in the manner of the spring retainer 6b as per FIG. 8 of the application-side pad retaining spring 6.

FIG. 16 illustrates a schematic perspective view of a variant of the clamp element as retainer 12.

The clamp element as retainer 12 has already been described in detail above in conjunction with FIGS. 4 to 7. Here, only the differences in relation thereto will be discussed below.

The face section 12b is formed as a continuous plate without openings. In each case one retaining section 12c is attached via a cranked transition section 12'g to both sides of the face section 12b. The retaining sections 12c form, at their sides pointing toward the rear surface 5b of the pad rear plate 5a, in each case one retaining surface 12q. The cranked transition sections 12'g ensure a spacing between the retaining surfaces 12q and the rear surface 5b. This spacing is dimensioned so as to correspond to the end sections 11e of the bracket element 11 such that the end sections 11e can, after passing the respective lower edge of the retaining section 12c during the mounting process, be easily arranged in the z direction between the retaining surfaces 12q and the rear surfaces 5b by virtue of the arms 11d of the bracket element 11 springing upward.

Here, the lug section 12i extends all the way through the opening 50 and is, after the mounting process, connected, for example welded, to a lower edge of the face section 12. The face section 12b may for this purpose also have a connecting section 12f.

A lug 12j with a function for spacing the retaining sections 12c apart from the rear surface 5b of the pad rear plate 5a is not provided here. This function is performed by virtue of that surface of the face section 12b which points toward the rear surface 5b of the pad rear plate 5a lying directly on the rear surface 5b of the pad rear plate 5a, and the two retaining sections 12c being attached laterally so as to be cranked forwardly in the positive y direction from the face section 12b. In this way, the respective spacing of the retaining sections 12c to the rear surface 5b of the pad rear plate 5a is realized.

The face section 12b furthermore has the above-described recess 12k. The above-described recess 12l may likewise be provided.

Since the retaining sections 12c are arranged laterally on the face section 12b, the associated bracket element 11 in this case has cranked portions 11'h in the x-y plane, via which cranked portions the end sections 11e are attached to the respectively associated arms 11d. The cranked portions 11'h thus permit the adaptation of the end sections 11e of the bracket element 11 to the relatively large spacing of the retaining sections 12c to one another in the x direction.

FIGS. 17-20 show schematic perspective views of variants of the first embodiment of the securing device 10 with actuation sections 20.

In the embodiments as per FIGS. 17-20, the respective face section 12b of the respective clamp element 12 lies with its respective surface pointing toward the rear surface 5b of the pad rear plate 5a directly on the rear surface 5b of the pad rear plate 5a. Since, for the engagement of the respective hook-shaped end sections 11e of the respective bracket element 11, the respectively associated retaining section 12c must assume a corresponding spacing to the rear surface 5b of the pad rear plate 5a, the pad rear plate 5a is equipped in these regions with a recess 52.

In these variants, the respective bracket element 11 is formed such that the arms 11d have, at the end section 8b of the pad retaining clip 8, in each case one receptacle for the end section 8b or transverse section 8d between an arm section under the straight end of each transition section 8c of the pad retaining clip 8, a face section 11c and a narrow plate section 11a on the straight end of each transition section 8c. A continuous plate section 11a as shown in FIGS. 2 and 3 is not provided here. These arm ends are fastened to the end section 8b for example by one of the above-described connection types. A fastening would also be conceivable without the plate section 11a and without the face sections 11b, 11c (as already described above).

The actuation sections 20 serve for the easy release of the engagement of the end sections 11e of the associated bracket elements 11 during an installation of the respective pad retaining clip 8. For this purpose, the actuation sections 20 enable the arms 11d to be easily pushed downward in the negative z direction counter to their spring force.

Figure 17:
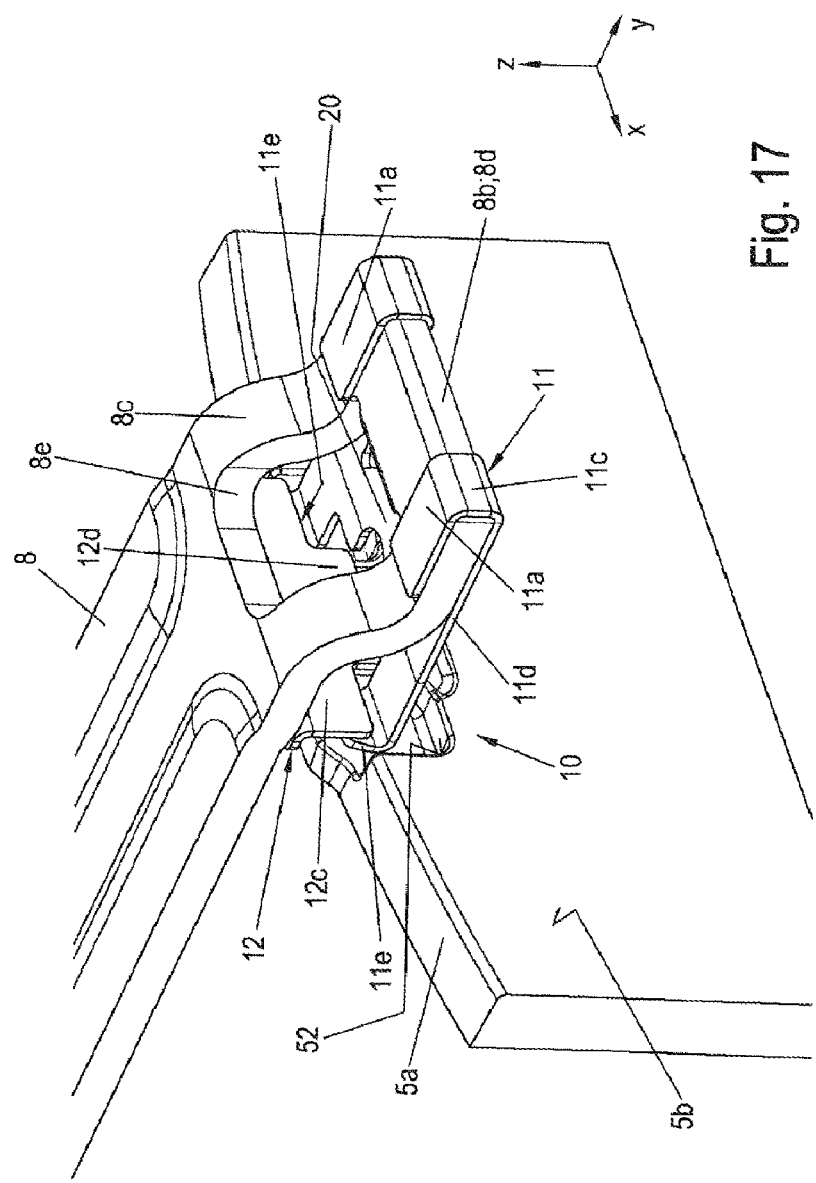
Figure 18:
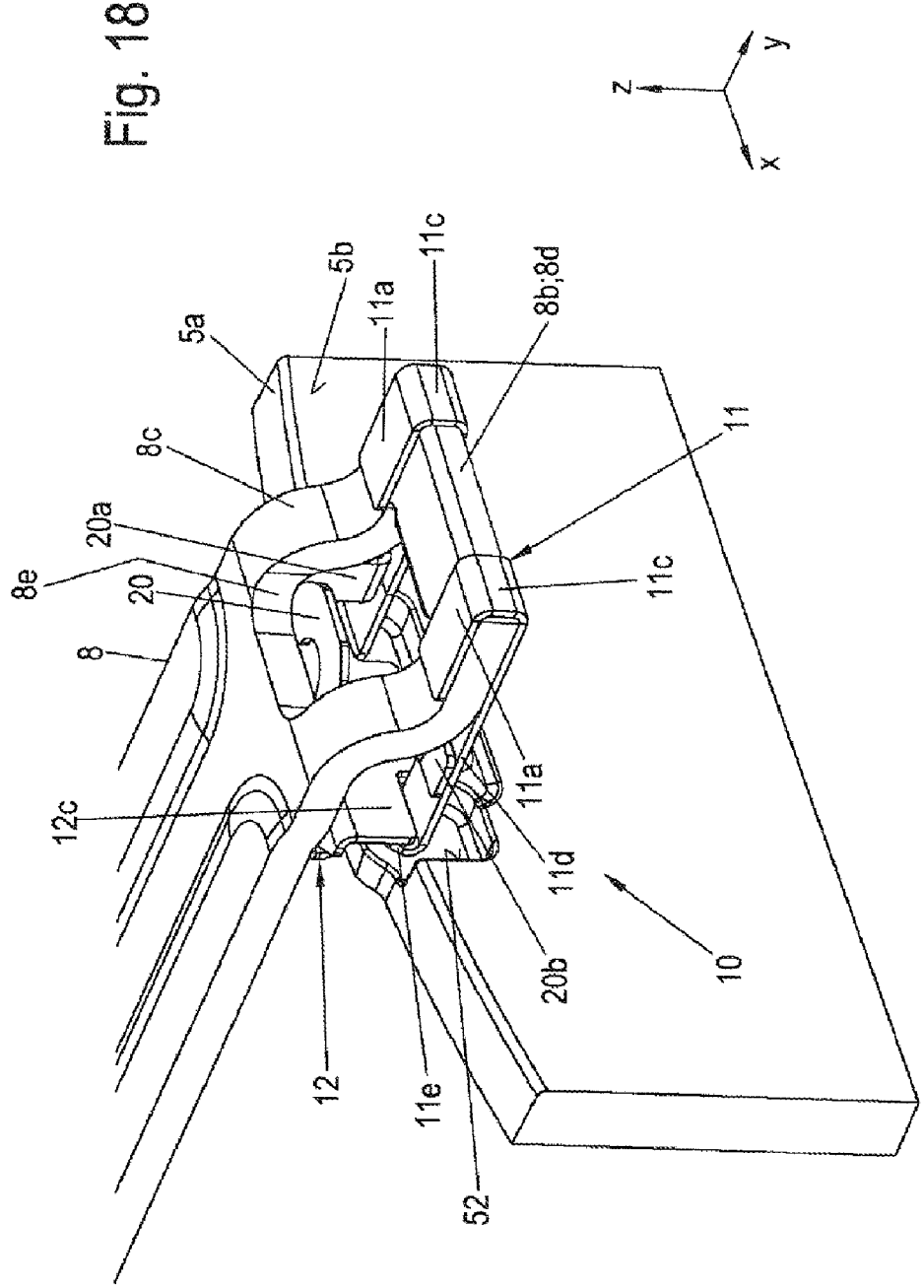

The actuation sections 20 of FIGS. 17 and 18 may be configured with the attribute of being "situated at the inside", that is to say of being accessible through the opening 8e of the pad retaining clip 8. By contrast, the actuation sections 20 of FIGS. 19 and 20 may have the attribute of being "situated at the outside", that is to say of being arranged on both sides adjacent to the pad retaining clip.

The actuation section 20 in the variant as per FIG. 17 is formed by a flat transverse connection between the arms 11d of the bracket element 11. Said transverse connection lies in the same x-y plane as the arms 11d and is formed so as to project in arcuate fashion in the y direction such that the actuation section 20 can, through the opening 8e between the transition sections 8c of the pad retaining clip 8, be accessed using a simple tool, for example a screwdriver, or else manually. The actuation section 20 may also be attached, for example retroactively welded, as a separate part between the arms 11d.

In the variant as per FIG. 18, the actuation section 20 is attached to the arms 11d, with a spacing in the z direction, by means of supports 20a.

The actuation section 20 is in this case also formed so as to project in arcuate fashion in order to provide easy accessibility through the opening 8e. To the two sides of said actuation section there is attached in each case one support 20a, which extends downwardly in the negative z direction and, at its lower end, has a fastening section 20b which is attached or bent at right angles. Each fastening section 20b is fastened, for example welded, to a respective arm 11d of the bracket element 11. The length of the supports 20a determines the spacing of the actuation section 20 from the x-y plane of the arms 11d. The arcuate actuation section 20 and the supports 20a with the fastening sections 20b may also be formed in one piece as a punched/bent part. It is also conceivable for the arms 11d with the end sections 11e to be produced as a common component together with the arcuate actuation section 20, the supports 20a and the fastening sections 20b, for example also as a punched/bent part.

Figure 19:
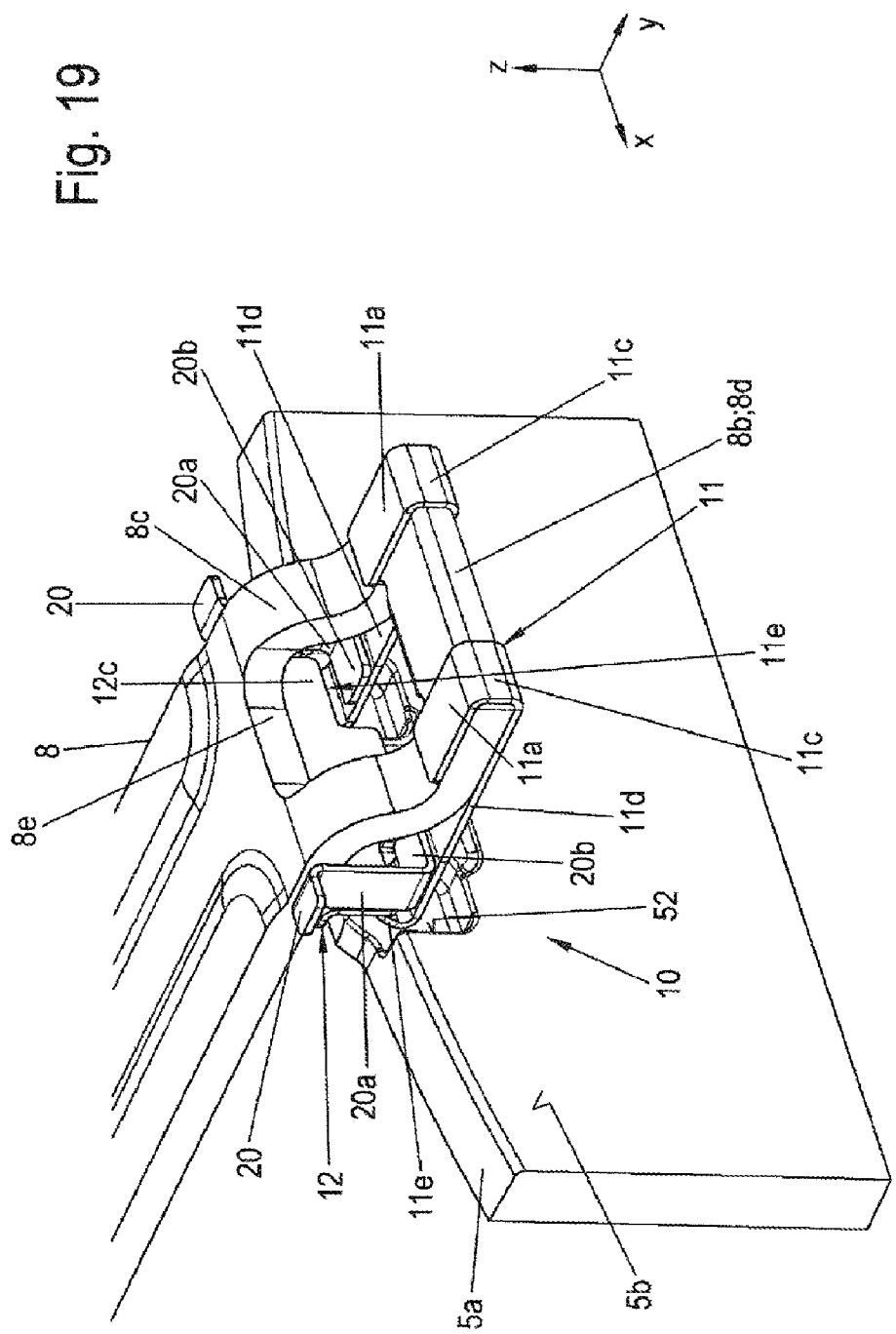

FIG. 19 shows a variant with fastening sections 20 arranged on both sides adjacent to the pad retaining clip 8. Said fastening sections are a constituent part of a respective Z-shaped angle and form the upper, short section of the Z shape, by virtue of the fact that they point in mirror-symmetrical fashion with respect to one another in the positive and negative x directions in each case from one side of the pad retaining clip 8. The actuation sections 20 are connected in each case to a support 20a which runs downward at right angles and which, in each case at its lower end, has a fastening section 20b which is attached or bent at right angles and which is attached to the associated arm 11d, for example by welding. In this case, too, the length of the supports 20a determines a spacing of the actuation section 20 from the x-y plane of the arms 11d.

The actuation sections 20 lie in this case in an x-y plane approximately in alignment with the upper side of the pad retaining clip 8 at the start of the S-shaped transition sections 8c.

In this case, too, it is conceivable for the arms 11d with the end sections 11e, face sections 11c and plate sections 11a including the actuation sections 20, the supports 20a and the fastening sections 20b to be formed as a two-part or single-part component, for example punched/bent part.

Figure 20A:
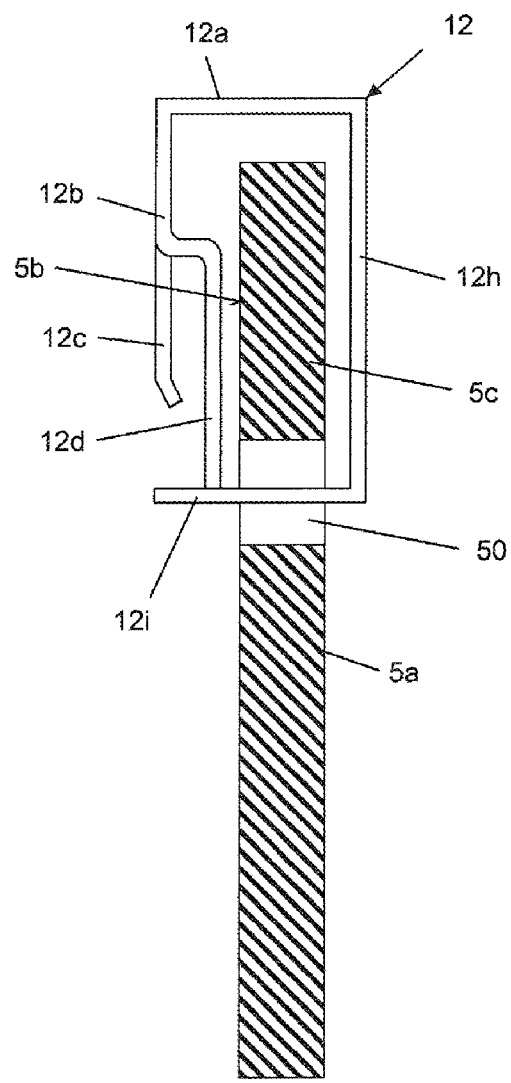
FIG. 20A shows a schematic sectional view of the variant of the clamp element as per FIG. 20.

A further variant in relation to FIG. 19 is illustrated in FIG. 20, wherein the actuation sections 20 are formed in each case by a widened portion of each arm 11d a short distance before each end section 11e in the x-y plane of the arms 11d. Said widened portions run in each case in the positive and negative x directions over an extent which corresponds approximately to the width of an arm in the x direction. An edge of each of said widened portions pointing toward the end section 8b of the pad retaining clip 8 is beveled. This variant is advantageous because the bracket element can in this case be a simple single punched/bent part.

Figure 21:
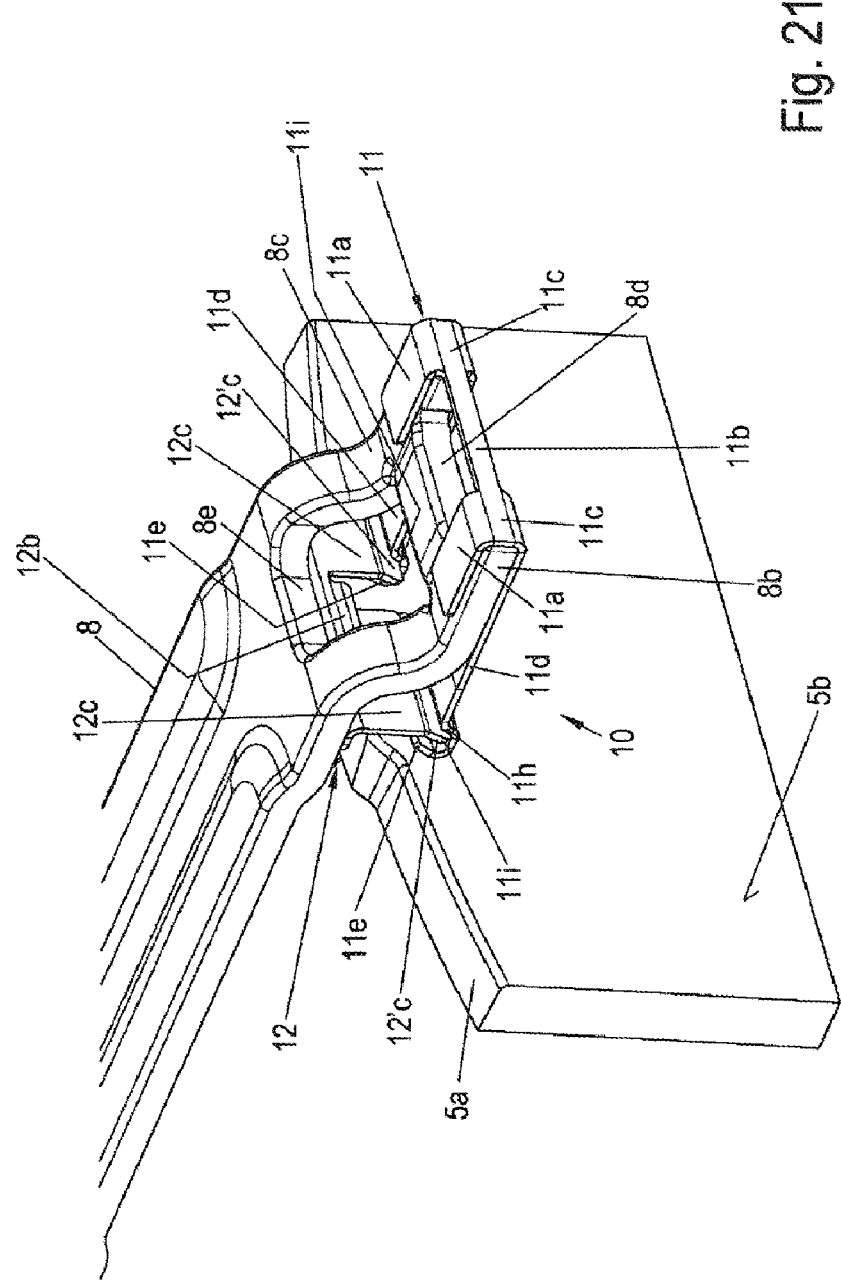

FIGS. 21-23 illustrate schematic perspective views of further variants of the first embodiment of the securing device 10.

The securing devices 10 of these variants all have a clamp element as retainer 12.

The clamp element as retainer 12 has already been described in detail above in conjunction with FIGS. 4 to 7. Here, only the differences in relation thereto will be discussed below.

The required spacing of the retaining sections 12c to the rear surface 5b of the pad rear plate 5a is realized for example by a face section 12*d* which is cranked in the negative y direction. Here, that surface of the face section 12*b* which points toward the rear surface 5*b* of the pad rear plate 5*a* bears against the rear surface 5*b* of the pad rear plate 5*a*. This is shown in a schematic sectional view of the clamp element 12 in a y-z plane in the brake disk axis of rotation 2*a*.

The face section 12*b* has no openings 12*e* and extends in the negative z direction only over a short distance. In each case one first retaining section 12*c* is arranged at both sides of the face section 12*b*. Each first retaining section 12*c* extends approximately over three times the length of the face section 12*b* in the negative z direction. To each lower edge of a respective first retaining section 12*c* there is attached a further, second retaining section 12'*c* which is angled toward the rear surface 5*b* of the pad rear plate 5. A narrow-side length of said second retaining section 12'*c* corresponds approximately to one quarter of the side length in the negative z direction of the first retaining section 12*c*.

In the assembled state, that is to say when the bracket element 11 is in engagement with the clamp element as retainer 12, the lower edge of said second retaining section 12'*c* is in contact with the contact section 11*i* of the respective arm 11*d* of the bracket element 11 as in FIG. 13. In this state, it is furthermore the case that the respective hook-shaped end section 11*e* of the bracket element 11 is arranged behind the second retaining section 12'*c*, that is to say between the second retaining section 12'*c* and the rear surface 5*b* of the pad rear plate 5. Here, contact of the respective hook-shaped end section 11*e* with the second retaining section 12'*c* has the effect of arresting the bracket element 11 and thus the pad retaining clip 8 connected thereto, in the longitudinal direction thereof.

The engagement of the hook-shaped end sections 11*e* of the bracket element 11 takes place as already described above for the installation of the pad retaining clip 8.

In this variant, the bracket element 11 has a similar design of the fastening to the end section 8*b* of the pad retaining clip 8 in relation to the bracket element 11 of FIGS. 17 to 20, wherein here, however, the two face sections 11*c* are connected by a further face section 11*b*.

The variant as per FIG. 22 shows a bracket element 11 formed in the manner of a strip. A face section 11*b* is arranged in front of, and fastened to, the end section 8*b* of the pad retaining clip 8. The face section 11*b* runs in an x-z plane and transitions at each side into a rounded face section 11*c*. The rounded face sections 11*c* are furthermore each connected to an arm 11*d*, on the respective end of which there is integrally formed a hook-shaped end section 11*e*. A length of the end section 11*e* in the z direction corresponds to approximately one third of the length of the arm 11*d* in the z direction. The end section 11*e* is bent away from the arm 11*d* and is inclined at an angle of less than 90° with respect thereto.

The arms 11*d* together with the rounded face sections 11*c* are, by contrast to the bracket elements 11 described above, resiliently pivotable about an axis running in the z direction. Here, in order to release the engagement of the end sections 11*e* and the retainer 12, said bracket elements are moved toward one another in the positive and negative x directions, wherein said bracket elements are then moved apart from one another by the spring force during the production of the engagement action.

The retainer 12 is a clamp element and, by contrast to the retainer 12 described above, has two retaining sections 12*c*, of which in each case one is attached to one side of the face section 12*b*, at right angles with respect to the face section 12*b*. Each retaining section 12*c* lies in a y-z plane and has a rectangular opening 12*e* which, in the installed state of the pad retaining clip 8, is in each case in engagement with a hook-shaped end section 11*e* of the bracket element 11. The retaining sections 12*c* extend in the y direction. The openings 12*e* are elongate rectangles, the relatively long sides of which run in the z direction.

During the installation process, the arms 11*d* are pushed resiliently toward one another when the slopes of the hook-shaped end sections 11 slide past the front edges of the retaining sections 12*c*. After the pad retaining clip 8 has been slid further in the negative y direction, the hook-shaped end sections 11*e* are pushed apart from one another, by the spring action of the arms 11*d* of the bracket element 11, into the openings 12*e* of the retaining sections 12*c* of the retainer 12, as shown in FIG. 22 in the installed position, and produce the engagement with the retainer 12. The pad retaining clip 8 is thus fixed in the y direction. During the uninstallation process, the arms 11*d* are pushed toward one another again in order to release the respective engagement of the end sections 11*e* with the openings 12*e* of the retaining sections 12*c*.

FIG. 23 shows a variant in which the retainer 12 of the securing device 10 is a clamp element.

The clamp element has already been described in detail above. By contrast thereto, the clamp element in this variant has, on both sides of the face section 12*b*, in each case one retaining section 12*c* which is extended downward in the negative z direction. Each retaining section 12*c* is connected at its outer side to a lug 12'*j* which is bent toward the rear surface 5*b* of the pad rear plate 5*a*. Said lugs 12'*j* serve as a stop for the fixing of the clamp element in the y direction. In this way, a spacing between the pad rear plate 5*a* and the respective retaining section 12*c* is formed, which spacing is necessary for the engagement of the hook-shaped end sections 11*e* of the bracket element 11, as will be discussed in more detail below.

The face section 12*b* is, centrally, extended downward by the face section 12*d*, which is provided for the connection to the lug section 12*i*. This is not shown here, but can be seen for example from FIG. 4 and/or FIG. 6.

By contrast to the pad retaining clips 8 described above, this pad retaining clip 8 has no transverse section 8*d*. The opening 8*e* between the transition sections 8*c* is thus not closed at the end section 8*b*. The free ends of the transition sections 8*c* in this case form in each case one end section 8*b* of the pad retaining clip 8.

In this variant, the bracket element 11 is arranged in the opening 8*e* between the transition sections 8*c* of the pad retaining clip 8. The bracket element 11 is constructed from two arms 11*d*, which are in this case not connected to one another, though this is conceivable. By contrast to the other bracket elements 11, the arms 11*d* run in a y-z plane and bear in each case against an inner side of the straight region of each transition section 8*c* of the pad retaining clip 8.

Each arm 11*d* is equipped, at its front end shown in FIG. 23, with a face section 11*c* which is bent at right angles. Using this face section 11*c*, each arm 11*d* is fastened to a face section of the end section 8*b* of the pad retaining clip 8. This may be realized for example by a welded connection.

Each arm 11*d* extends in the negative y direction through the opening 8*e*, wherein each arm 11*d* is, in the vicinity of each upwardly running bend of each transition section 8*c* of the pad retaining clip 8, extended downward in the negative z direction and upward in the positive z direction. The upward extension is formed in each case as an actuation section 20. The actuation sections 20 run in each case in a y-z plane, are situated opposite one another in the opening 8*e*, and project out of the opening 8*e* so as to be easily accessible.

The upwardly running extensions of the arms 11*d* with the actuation sections 20 extend in the negative y direction to such an extent that the lower bend of the transition sections 8*c* is covered. The arms 11*d* thereafter transition in each case into a connecting section 11*j*, the length of which in the z direction has approximately the length of the arms 11*d* in the z direction. The connecting sections 11*j* are however offset slightly downward in the z direction such that an upper edge of the connecting sections 11*j* is offset downward in the negative z direction in relation to the upper edge of the arms 11*d* by approximately one quarter of the length of the arms 11*d* in the z direction.

On the ends of each connecting section 11*j* there is integrally formed in each case one hook-shaped end section 11*e*. Said end sections are not visible in FIG. 23 but are formed in the manner of the end sections 11*e* as per FIG. 22. In FIG. 23, the end sections 11*e* are in engagement behind the retaining sections 12*c*. The contact of the end sections 11*e* of the bracket element 11 and the retaining sections 12*c* of the retainer 12 causes the pad retaining clip 8 to be arrested in the y direction.

During the installation of the pad retaining clip 8 in the negative y direction, the arms 11*d* are pushed resiliently toward one another when the slopes of the hook-shaped end sections 11 slide past the vertical edges of the retaining sections 12*c*. After the pad retaining clip 8 has slid further in the negative y direction, the hook-shaped end sections 11*e* are pushed apart from one another, by the spring action of the arms 11*d* of the bracket element 11, outward behind the retaining sections 12*c* of the retainer 12, and produce the engagement with the retainer 12. The pad retaining clip 8 is thus fixed in the y direction. During the uninstallation process, the arms 11*d* are pushed toward one another again by the actuation sections 20 projecting out of the opening 8*e* of the pad retaining clip 8, in order to release the respective engagement of the end sections 11*e* with the retaining sections 12*c*.

Finally, FIG. 24 shows a schematic perspective view of the brake pad 5 with a third embodiment of the securing device 10.

The retainer 12 of the securing device 10 is formed as a clamp element similar to that described in conjunction with FIGS. 4 and 5. By contrast thereto, the clamp element in this variant has an opening 12*e* or two openings either in the plate section 12*a* or in the side section 12*h*. Here, the plate section 12*a* or the side section 12*h* forms a retaining section 12*c* in the region of the opening 12*e*. This is not shown here, but is easily conceivable.

It is however also conceivable for no opening(s) 12*e* to be provided in the side section 12*h*. In such a case, the side section 12*h* may be equipped with a lug as retaining section 12*c*, which lug engages with the end section 11*e* of the bracket element 11'. This possibility is shown in FIG. 24A in a schematic sectional view in a y-z plane, which runs in the brake disk axis of rotation 2*a*.

The bracket element 11' of the securing device 10 is fastened to a top side 21 of the pad retaining clip 8, centrally in the longitudinal direction thereof, by a plate section 11*a* which extends in the y direction, that is to say in the longitudinal direction of the pad retaining clip 8. A downwardly bent arm 11*d* is attached to the front end of the plate section 11*a*. The arm 11*d* extends in the negative z direction through an opening 8'*e* through the pad retaining clip 8. The arm 11*d* is movable resiliently in the opening 8'*e*. The hook-shaped end section 11*e* as already described above is integrally formed on that end of the arm 11*d* which is not visible here but which is easily conceivable. The hook-shaped end section 11*e* is in engagement with the opening 12*e* of the retainer 12, as already described above.

Figure 24A:
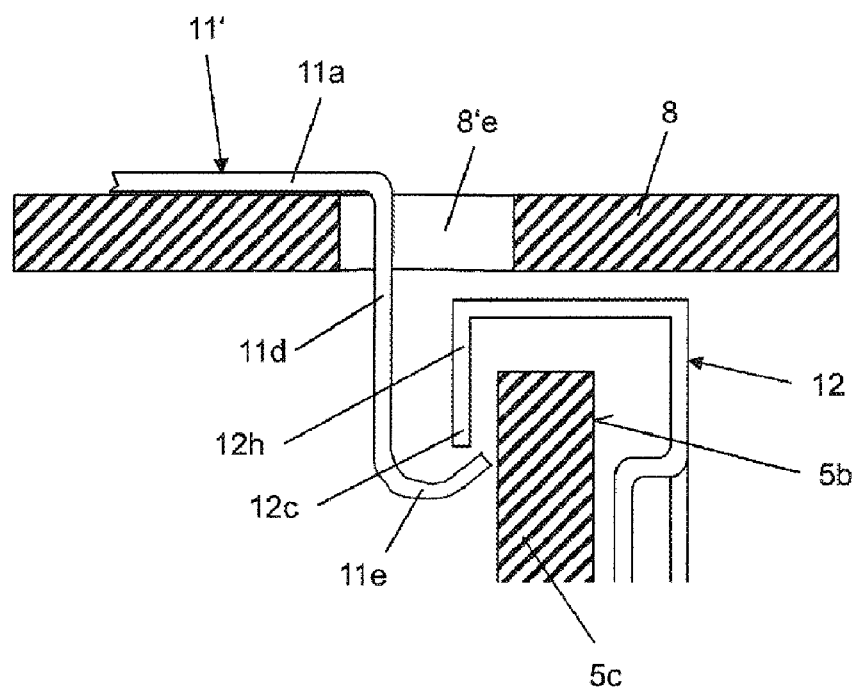
FIG. 24A shows a schematic partially sectional view of the third embodiment as per FIG. 24.

In the embodiment shown in FIG. 24A, the hook-shaped end section 11*e* is in engagement with the retaining section 12*c* of the side section 12*h* of the clamp element 12.

During the installation of the pad retaining clip 8, the latter is, above the retainer 12, mounted downwardly in the negative z direction onto said retainer, wherein the slope of the hook-shaped end section 11*e* of the bracket element 11 slides over the edge of the opening 12*e* of the retainer 12, which is possible owing to the resilient arm 11*d*. In the installed state of the pad retaining clip 8, the hook-shaped end section 11*e* has sprung back and is in engagement with the retainer 12. The pad retaining clip 8 is thus arrested. A release of the engagement of the securing device 10 is performed by virtue of the resilient arm 11*d* being pushed through the opening 8'*e* by a tool such that the hook-shaped end section 11*e* passes out of engagement with the opening 12*e* of the retainer 12.

The brake pad set 100 with the securing device 10 may be used in all disk brakes 1 with a sliding caliper, in particular for utility vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

1 Disk brake
2 Brake disk axis of rotation
3 Brake caliper
3*a* Application section
3*b* Reaction section
3*c* Connecting section
4, 5 Brake pad
4*a*, 5*a* Pad rear plate
5*b* Rear surface
5*c* Web section
5*d* Retaining surface
6, 7 Pad retaining spring
6*a*, 7*a* Passage opening
6*b* Spring retainer
8 Pad retaining clip
8*a*, 8*b* End section
8*c* Transition section
8*d* Transverse section
8*e*, 8'*e* Opening
8*f* Surface
9 Bearing section
9*a* Retaining section
9*b* Receptacle
10 Securing device
11, 11' Bracket element
11*a* Plate section
11*b*, 11*c* Face section
11*d* Arm
11'*d* Arm plate
11*e* End section
11*f*, 11*g* Surface
11*h*, 11'*h* Cranked portion 11*i* Contact section
11*j* Connecting section
12, 12' Retainer
12*a* Plate section
12*b*, 12*d* Face section
12*c*, 12'*c* Retaining section
12*e* Opening
12*f*, 12'*f* Connecting section
12*g*, 12'*g* Transition section
12*h*, 12'*h* Side section
12*i* Lug section
12*j*, 12'*j* Lug
12*k*, 12*l* Recess
12*m* Edge
12*n* Central section
12*o*, 12*p* Bottom side
12*q* Retaining surface
12*r* Longitudinal section
13 Fastening
14 Connecting element
16 Stamping section
16 Deformation
17 Connection
18 Fastening surface
19 Fastening element
20 Actuation section
20*a* Web
20*b* Fastening section
21 Top side
50, 51 Opening
52 Recess
RS Rear side
ZS Application side
x, y, z Coordinates
$x_i, y_i, z_i$ where i=1; 2; 3 Coordinates

What is claimed is:

1. A disk brake for a vehicle, comprising:
a brake disk with a brake disk axis of rotation;
a brake caliper with an application section and a rear section;
at least two brake pads with in each case one pad rear plate;
a pad retaining spring for each of the at least two brake pads;
a pad retaining clip configured to be detachably located on the brake caliper and preload the at least two brake pads in a radially-inward direction; and
a securing device configured to secure the pad retaining clip on the brake caliper, the securing device forming a detachable connection between the pad retaining clip and the pad rear plate of a rear side one of the at least two the brake pads,
wherein
the securing device has at least one bracket element and at least one retainer,
when in an installed state of the pad retaining clip, at least one section of the at least one bracket element engages with at least one section of the retainer, and
the securing device is configured such that during the mounting and dismounting of the pad retaining clip, the at least one section of the at least one bracket element is movable counter to a spring force of the at least one section of the at least one bracket element or of at least one section connected to the at least one section of the at least one bracket element,
the retainer of the securing device is integrated into the pad rear plate of the rear-side brake pad,
the retainer has at least one opening through which the at least one section of the at least one bracket element extends,
an axial thickness of a web section above each of the at least one opening is less a thickness of the pad rear plate, and
in the installed state of the pad retaining clip, the at least one section of the at least one bracket element engages with the at least one section of the retainer with an end of the at least one section closer to the brake disk than the web section of each of the at least one opening.

2. A disk brake for a vehicle, comprising:
a brake disk with a brake disk axis of rotation;
a brake caliper with an application section and a rear section;
at least two brake pads with in each case one pad rear plate;
a pad retaining spring for each of the at least two brake pads;
a pad retaining clip configured to be detachably located on the brake caliper and preload the at least two brake pads in a radially-inward direction; and
a securing device configured to secure the pad retaining clip on the brake caliper, the securing device forming a detachable connection between the pad retaining clip and the pad rear plate of a rear side one of the at least two the brake pads,
wherein
the securing device has at least one bracket element and at least one retainer,
when in an installed state of the pad retaining clip, at least one section of the at least one bracket element engages with at least one section of the retainer, and
the securing device is configured such that during the mounting and dismounting of the pad retaining clip, the at least one section of the at least one bracket element is movable counter to a spring force of the at least one section of the at least one bracket element or of at least one section connected to the at least one section of the at least one bracket element, and
the retainer is formed as a clamp element and is attached to the pad rear plate of the rear-side brake pad.

3. The disk brake as claimed in claim 2, wherein
the retainer has a plate section, a face section with a retaining section, and a side section,
the face section with the retaining section and the side section are attached to the plate section in a substantially right-angled manner so as to be parallel to and spaced apart from one another, and
a fastening surface of the side section is configured to attach the retainer to a rear surface of the rear-side pad rear plate.

4. The disk brake as claimed in claim 2, wherein
the retainer is formed as a clamp element and spring retainer for the pad retaining spring of the rear-side brake pad.

5. The disk brake as claimed in claim 4, wherein
the retainer in the form of the clamp element includes a plate section, face sections, at least one retaining section, a side section, and a lug section,
the face section, the at least one retaining section and the side section are attached to the plate section in a substantially right-angled manner so as to be parallel to and spaced apart from one another, the lug section is parallel to the plate section and extends through an opening of the pad rear plate, and after the mounting of the retainer on the pad rear plate the lug section is fixedly connected to the face section.

6. The disk brake as claimed in claim 5, wherein the side section of the retainer extends at least partially through a passage opening of the retaining spring of rear-side pad, a partial section of the rear-side pad retaining spring is retained between the plate section of the retainer and the rear-side pad rear plate such that the rear-side pad retaining spring is retained on the rear-side brake pad.

7. The disk brake as claimed in claim 6, wherein the at least one retaining section of the retainer has at least one opening through which the at least one section of the at least one bracket element extends, and in the installed state of the pad retaining clip, the at least one section of the at least one bracket element engages with the at least one retaining section of the retainer.

8. The disk brake as claimed in claim 5, wherein the retainer has a stop in a direction parallel to the brake disk axis of rotation, the retainer bears against the rear-side pad rear plate via the stop.

9. The disk brake as claimed in claim 8, wherein the stop is a lug arranged at the plate section in a substantially right-angled manner and arranged between the face section and the side section parallel to and spaced apart from the face and side sections, and a web section of the rear-side pad rear plate is received between the lug and an inner side of the side section.

10. The disk brake as claimed in claim 8, wherein the stop is a lug arranged at the at least one retaining section and bears against a rear surface of the rear-side pad rear plate.

11. The disk brake as claimed in claim 5, wherein an edge region of a bottom side of a central section of the plate section of the retainer is exposed by at least one recess in the retainer aligned with a direction of the pad retaining spring.

12. The disk brake as claimed in claim 5, wherein the at least one bracket element is attached to an end section of the pad retaining clip.

13. The disk brake as claimed in claim 12, wherein the at least one section configured to engage with the at least one section of the retainer of the at least one bracket element includes at least one resilient arm with a hook-shaped end section, and in the installed state of the pad retaining clip, the hook-shaped end section engages with the at least one section of the retainer.

14. The disk brake as claimed in claim 13, wherein the at least one bracket element includes a plate section to which the at least one resilient arm is attached via a face section parallel to the plate section, and the plate section, the face section and a section parallel to the plate section of the at least one arm form a receptacle for an end section of the pad retaining clip.

15. The disk brake as claimed in claim 13, wherein the bracket element has at least one resilient arm with the hook-shaped end section, and the at least one resilient arm is attached with a section under the end section of the pad retaining clip.

16. The disk brake as claimed in claim 13, wherein the at least one resilient arm of the bracket element is connected to the hook-shaped end section by at least one cranked portion.

17. The disk brake as claimed in claim 13, wherein the at least one resilient arm of the bracket element is connected to in the at least one hook-shaped end section via a forked portion.

18. The disk brake as claimed in claim 12, wherein the at least one resilient arm of the bracket element includes at least one actuation section.

19. The disk brake as claimed in claim 7, wherein the retainer has two retaining sections, each retaining section being attached to a side of the face section at right angles with respect to the face section and having an opening configured to engage a hook-shaped end section of the bracket element in the installed state of the pad retaining clip, the bracket element is a strip and includes a face section arranged in front of and fastened to the end section of the pad retaining clip, in each case a resilient arm with the hook-shaped end section is attached by a rounded face section to each side of the retainer face section, the end sections with the resilient arms are configured to engage with the respective opening of the associated retaining section such that during the mounting of the pad retaining clip the end sections move resiliently away from one another, and during dismounting of the pad retaining clip the end sections move toward one another counter to the spring force of the resilient arms.

20. The disk brake as claimed in claim 7, wherein the plate section of the retainer forms the retaining section with the at least one opening, the bracket element of the securing device has a plate section extending in a longitudinal direction and is secured centrally in the longitudinal direction on a top side of the pad retaining clip, a downwardly bent resilient arm is attached to a front end of the plate section and extends through an opening of the pad retaining clip, and the hook-shaped end section is integrally formed on a free end of the downwardly bent resilient arm and engages the opening of the retainer.

21. The disk brake as claimed in claim 1, wherein the bracket element is connected to the pad retaining clip by at least one of riveting, screwing, welding, clinching and stamping, and the bracket element includes arms with hook-shaped end sections, respective ends of the arms being connected to one another by an arm plate, and the arm plate is connected to the pad retaining clip.

22. A brake pad set for a disk brake as claimed in claim 1, wherein the at least two brake pads include only two brake pads having the respective pad rear plates, and the brake pad set includes the two brake pads, the respective pad retaining springs, the pad retaining clip and the securing device.

* * * * *